US012679676B2

(12) United States Patent
Allen et al.

(10) Patent No.: US 12,679,676 B2
(45) Date of Patent: Jul. 14, 2026

(54) SYSTEMS AND METHODS FOR DYNAMIC PROCESSING OF OBJECTS PROVIDED IN VEHICLES WITH OBSTRUCTION REMEDIATION

(71) Applicant: Berkshire Grey Operating Company, Inc., Bedford, MA (US)

(72) Inventors: Thomas Allen, Reading, MA (US); Benjamin Cohen, Somerville, MA (US); John Richard Amend, Jr., Belmont, MA (US); Joseph Romano, Arlington, MA (US); Matthew T. Mason, Pittsburgh, PA (US); Yanchun Wu, Sharon, MA (US); Jagtar Singh, Burlington, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 834 days.

(21) Appl. No.: 17/961,493

(22) Filed: Oct. 6, 2022

(65) Prior Publication Data

US 2023/0105141 A1        Apr. 6, 2023

Related U.S. Application Data

(60) Provisional application No. 63/252,807, filed on Oct. 6, 2021, provisional application No. 63/252,811, filed on Oct. 6, 2021.

(51) Int. Cl.
| | |
|---|---|
| *B65G 67/24* | (2006.01) |
| *B65G 43/00* | (2006.01) |
| *G06V 20/59* | (2022.01) |

(52) U.S. Cl.
CPC ............. *B65G 67/24* (2013.01); *B65G 43/00* (2013.01); *G06V 20/59* (2022.01)

(58) Field of Classification Search
CPC ...... B65G 67/24; B65G 43/00; B65G 47/918; G06V 20/59; B25J 9/0084; B25J 9/0093; B25J 9/1682; B25J 15/0616
See application file for complete search history.

(56) References Cited

U.S. PATENT DOCUMENTS

| 3,721,354 A | 3/1973 | Raynes et al. |
|---|---|---|
| 3,734,286 A | 5/1973 | Simjian |

(Continued)

FOREIGN PATENT DOCUMENTS

| AU | 2006204622 A1 | 3/2007 |
|---|---|---|
| CA | 2985166 A1 | 12/2016 |

(Continued)

OTHER PUBLICATIONS

EP2500150 spec with paragraph numbers (Year: 2012).*

(Continued)

*Primary Examiner* — Jacob S. Scott
*Assistant Examiner* — Erin Morris
(74) *Attorney, Agent, or Firm* — Gesmer Updegrove LLP

(57) ABSTRACT

An object processing system is disclosed for facilitating removal of objects from a trailer of a tractor trailer. The object processing system includes an object obstruction detection system for identifying an obstruction during removal of objects, a force application system for applying any of a plurality of defined forces to the obstruction, an assessment system for collecting force feedback information responsive to the application of force to the obstruction and providing assessment information, and a control system for providing a removal model for removing the obstruction based on the assessment information.

25 Claims, 29 Drawing Sheets

(56) References Cited

U.S. PATENT DOCUMENTS

| | | | |
|---|---|---|---|
| 3,779,405 | A | 12/1973 | Kavanaugh, Jr. |
| 4,094,419 | A | 6/1978 | Krüger |
| 4,186,836 | A | 2/1980 | Wassmer et al. |
| 4,253,791 | A | 3/1981 | Van Drie |
| 4,557,659 | A | 12/1985 | Scaglia |
| 4,653,634 | A | 3/1987 | Hansen |
| 4,722,653 | A | 2/1988 | Williams et al. |
| 4,759,439 | A | 7/1988 | Hartlepp |
| 4,776,742 | A | 10/1988 | Felder |
| 4,802,810 | A | 2/1989 | Gunn |
| 4,815,582 | A | 3/1989 | Canziani |
| 4,846,335 | A | 7/1989 | Hartlepp |
| 5,035,313 | A | 7/1991 | Smith |
| 5,154,271 | A | 10/1992 | Binzen |
| 5,352,081 | A | 10/1994 | Tanaka |
| 5,460,271 | A | 10/1995 | Kenny et al. |
| 5,509,723 | A | 4/1996 | Bratlie |
| 5,595,263 | A | 1/1997 | Pignataro |
| 5,685,687 | A | 11/1997 | Frye |
| 5,764,013 | A | 6/1998 | Yae |
| 5,803,701 | A | 9/1998 | Filiberti et al. |
| 5,839,566 | A | 11/1998 | Bonnet |
| 6,011,998 | A | 1/2000 | Lichti et al. |
| 6,044,957 | A | 4/2000 | Guttinger |
| 6,059,092 | A | 5/2000 | Jerue et al. |
| 6,076,023 | A | 6/2000 | Sato |
| 6,401,936 | B1 | 6/2002 | Isaacs et al. |
| 6,402,451 | B1 | 6/2002 | Brown |
| 6,431,346 | B1 | 8/2002 | Gilmore et al. |
| 6,579,053 | B1 | 6/2003 | Grams et al. |
| 6,721,444 | B1 | 4/2004 | Gu et al. |
| 7,313,464 | B1 | 12/2007 | Perreault et al. |
| 7,474,939 | B2 | 1/2009 | Oda et al. |
| 7,516,848 | B1 | 4/2009 | Shakes et al. |
| 7,861,844 | B2 | 1/2011 | Hayduchok et al. |
| 8,662,314 | B2 | 3/2014 | Jones et al. |
| 8,718,814 | B1 | 5/2014 | Clark et al. |
| 8,874,270 | B2 | 10/2014 | Ando |
| 8,952,284 | B1 | 2/2015 | Wong et al. |
| 8,972,045 | B1 | 3/2015 | Mountz et al. |
| 9,038,828 | B2 | 5/2015 | Enenkel |
| 9,061,868 | B1 | 6/2015 | Paulsen et al. |
| 9,120,622 | B1 | 9/2015 | Elazary et al. |
| 9,227,323 | B1 | 1/2016 | Konolige et al. |
| 9,259,844 | B2 | 2/2016 | Xu et al. |
| 9,283,680 | B2 | 3/2016 | Yasuda et al. |
| 9,315,345 | B2 | 4/2016 | Girtman et al. |
| 9,393,686 | B1 | 7/2016 | Bradski et al. |
| 9,415,949 | B2 | 8/2016 | Buse |
| 9,434,558 | B2 | 9/2016 | Criswell |
| 9,457,970 | B1 | 10/2016 | Zevenbergen et al. |
| 9,486,926 | B2 | 11/2016 | Kawano |
| 9,487,361 | B2 | 11/2016 | Girtman et al. |
| 9,492,923 | B2 | 11/2016 | Wellman et al. |
| 9,493,316 | B2 | 11/2016 | Girtman et al. |
| 9,517,886 | B2 | 12/2016 | Petersen et al. |
| 9,520,012 | B2 | 12/2016 | Stiernagle |
| 9,533,841 | B1 | 1/2017 | Criswell |
| 9,555,982 | B2 | 1/2017 | Girtman et al. |
| 9,604,363 | B2 | 3/2017 | Ban |
| 9,623,569 | B2 | 4/2017 | McCollum et al. |
| 9,650,215 | B2 | 5/2017 | Girtman |
| 9,688,489 | B1 | 6/2017 | Zevenbergen et al. |
| 9,701,492 | B2 | 7/2017 | Criswell |
| 9,738,463 | B2 | 8/2017 | Wicks et al. |
| 9,744,669 | B2 | 8/2017 | Wicks et al. |
| 9,828,195 | B1 | 11/2017 | Criswell |
| 9,938,092 | B2 | 4/2018 | McMurrough et al. |
| 9,969,573 | B2 | 5/2018 | Girtman et al. |
| 9,982,691 | B2 | 5/2018 | Girtman et al. |
| 10,005,627 | B2 | 6/2018 | Girtman et al. |
| 10,029,374 | B2 | 7/2018 | McCollum et al. |
| 10,035,667 | B2 | 7/2018 | Criswell |
| 10,065,811 | B2 | 9/2018 | McCarthy et al. |
| 10,124,967 | B2 | 11/2018 | Girtman et al. |
| 10,204,247 | B1 | 2/2019 | Hamer et al. |
| 10,206,519 | B1 | 2/2019 | Gyori et al. |
| 10,233,038 | B2 | 3/2019 | Girtman et al. |
| 10,239,701 | B2 | 3/2019 | Wicks et al. |
| 10,266,351 | B2 | 4/2019 | Criswell |
| 10,315,866 | B2 | 6/2019 | Yuvaraj et al. |
| 10,336,562 | B2 | 7/2019 | Girtman et al. |
| 10,343,858 | B2 | 7/2019 | McMurrough et al. |
| 10,464,762 | B2 | 11/2019 | Girtman |
| 10,521,626 | B2 | 12/2019 | Hamer et al. |
| 10,556,761 | B2 | 2/2020 | Criswell |
| 10,597,234 | B2 | 3/2020 | Clucas et al. |
| 10,597,235 | B2 | 3/2020 | Clucas et al. |
| 10,633,202 | B2 | 4/2020 | McMurrough et al. |
| 10,661,444 | B2 | 5/2020 | McCollum et al. |
| 10,662,007 | B2 | 5/2020 | Yuvaraj et al. |
| 10,776,651 | B2 | 9/2020 | Yuvaraj et al. |
| 10,807,805 | B2 | 10/2020 | Clucas et al. |
| 10,829,319 | B2 | 11/2020 | Girtman et al. |
| 10,906,742 | B2 | 2/2021 | Clucas et al. |
| 11,034,529 | B2 | 6/2021 | Wagner et al. |
| 11,049,282 | B2 | 6/2021 | Zhang et al. |
| 11,267,662 | B2 | 3/2022 | Geyer et al. |
| 11,465,864 | B2 | 10/2022 | McMurrough et al. |
| 11,518,629 | B2 | 12/2022 | Griggs |
| 2002/0134056 | A1 | 9/2002 | Dimario et al. |
| 2002/0179502 | A1 | 12/2002 | Cerutti et al. |
| 2003/0042112 | A1 | 3/2003 | Woerner et al. |
| 2004/0112719 | A1 | 6/2004 | Gilmore et al. |
| 2004/0144618 | A1 | 7/2004 | McDonald et al. |
| 2005/0002772 | A1 | 1/2005 | Stone |
| 2006/0153667 | A1 | 7/2006 | Pruteanu et al. |
| 2006/0242785 | A1 | 11/2006 | Cawley et al. |
| 2006/0260913 | A1 | 11/2006 | Wolf et al. |
| 2008/0082206 | A1 | 4/2008 | Egami et al. |
| 2008/0181753 | A1 | 7/2008 | Bastian et al. |
| 2009/0110522 | A1 | 4/2009 | Criswell |
| 2009/0110525 | A1 | 4/2009 | Criswell et al. |
| 2010/0125361 | A1 | 5/2010 | Mougin et al. |
| 2010/0180711 | A1 | 7/2010 | Kilibarda et al. |
| 2010/0217528 | A1 | 8/2010 | Sato et al. |
| 2010/0241260 | A1 | 9/2010 | Kilibarda et al. |
| 2011/0144798 | A1 | 6/2011 | Freudelsperger |
| 2012/0118699 | A1 | 5/2012 | Buchmann et al. |
| 2013/0343640 | A1 | 12/2013 | Buehler et al. |
| 2014/0005831 | A1 | 1/2014 | Naderer et al. |
| 2014/0050557 | A1 | 2/2014 | Criswell |
| 2014/0067121 | A1 | 3/2014 | Brooks et al. |
| 2014/0067127 | A1 | 3/2014 | Gotou |
| 2014/0197012 | A1 | 7/2014 | Miller et al. |
| 2014/0199142 | A1 | 7/2014 | Criswell |
| 2014/0205403 | A1 | 7/2014 | Criswell |
| 2014/0244026 | A1 | 8/2014 | Neiser |
| 2014/0277693 | A1 | 9/2014 | Naylor |
| 2014/0291112 | A1 | 10/2014 | Lyon et al. |
| 2014/0341694 | A1 | 11/2014 | Girtman et al. |
| 2014/0341695 | A1 | 11/2014 | Girtman et al. |
| 2014/0360924 | A1 | 12/2014 | Smith et al. |
| 2014/0364998 | A1 | 12/2014 | Neiser et al. |
| 2015/0037123 | A1 | 2/2015 | Hobbs |
| 2015/0037131 | A1 | 2/2015 | Girtman et al. |
| 2015/0057793 | A1 | 2/2015 | Kawano |
| 2015/0063972 | A1 | 3/2015 | Girtman et al. |
| 2015/0063973 | A1 | 3/2015 | Girtman et al. |
| 2015/0073589 | A1 | 3/2015 | Kohdl et al. |
| 2015/0098775 | A1 | 4/2015 | Razumov |
| 2015/0224650 | A1 | 8/2015 | Xu et al. |
| 2015/0274447 | A1 | 10/2015 | McCollum et al. |
| 2015/0306634 | A1 | 10/2015 | Maeda et al. |
| 2015/0308466 | A1 | 10/2015 | Girtman et al. |
| 2015/0352721 | A1 | 12/2015 | Wicks et al. |
| 2015/0360882 | A1 | 12/2015 | Girtman |
| 2015/0369618 | A1 | 12/2015 | Barnard et al. |
| 2015/0375398 | A1 | 12/2015 | Penn et al. |
| 2015/0375880 | A1 | 12/2015 | Ford et al. |
| 2016/0001991 | A1 | 1/2016 | Criswell |
| 2016/0027093 | A1 | 1/2016 | Crebier |
| 2016/0052732 | A1 | 2/2016 | Toews et al. |
| 2016/0075521 | A1 | 3/2016 | Puchwein et al. |

(56) References Cited

U.S. PATENT DOCUMENTS

| | | |
|---|---|---|
| 2016/0096694 A1 | 4/2016 | Baylor et al. |
| 2016/0136816 A1 | 5/2016 | Pistorino |
| 2016/0199884 A1 | 7/2016 | Lykkegaard et al. |
| 2016/0221187 A1 | 8/2016 | Bradski et al. |
| 2016/0221762 A1 | 8/2016 | Schroader |
| 2016/0221766 A1 | 8/2016 | Schroader et al. |
| 2016/0243704 A1 | 8/2016 | Vakanski et al. |
| 2016/0244262 A1 | 8/2016 | O'Brien et al. |
| 2016/0264366 A1 | 9/2016 | Heitplatz |
| 2016/0272427 A1 | 9/2016 | Kaeb et al. |
| 2016/0280477 A1 | 9/2016 | Pippin |
| 2016/0368720 A1 | 12/2016 | Criswell |
| 2017/0021499 A1 | 1/2017 | Wellman et al. |
| 2017/0043953 A1 | 2/2017 | Battles et al. |
| 2017/0050315 A1 | 2/2017 | Henry et al. |
| 2017/0057091 A1 | 3/2017 | Wagner et al. |
| 2017/0066597 A1 | 3/2017 | Hiroi |
| 2017/0073175 A1 | 3/2017 | Wicks et al. |
| 2017/0080566 A1 | 3/2017 | Stubbs et al. |
| 2017/0106532 A1 | 4/2017 | Wellman et al. |
| 2017/0113885 A1 | 4/2017 | Criswell |
| 2017/0121134 A1 | 5/2017 | Girtman et al. |
| 2017/0157648 A1 | 6/2017 | Wagner et al. |
| 2017/0297832 A1 | 10/2017 | Criswell |
| 2017/0305694 A1 | 10/2017 | McMurrough et al. |
| 2017/0312789 A1 | 11/2017 | Schroader |
| 2017/0349385 A1 | 12/2017 | Moroni et al. |
| 2018/0072517 A1 | 3/2018 | Girtman et al. |
| 2018/0111765 A1 | 4/2018 | Wicks et al. |
| 2018/0111769 A1 | 4/2018 | Yuvaraj et al. |
| 2018/0134501 A1 | 5/2018 | Ge et al. |
| 2018/0148279 A1 | 5/2018 | Criswell |
| 2018/0194574 A1 | 7/2018 | Wagner et al. |
| 2018/0290845 A1 | 10/2018 | McMurrough et al. |
| 2018/0297786 A1 | 10/2018 | Clucas et al. |
| 2018/0334339 A1 | 11/2018 | Criswell |
| 2018/0346264 A9 | 12/2018 | Girtman et al. |
| 2018/0362270 A1 | 12/2018 | Clucas et al. |
| 2019/0084769 A1 | 3/2019 | Clucas et al. |
| 2019/0262994 A1 | 8/2019 | Yuvaraj et al. |
| 2019/0315582 A1 | 10/2019 | Criswell |
| 2019/0370511 A1 | 12/2019 | Hamer et al. |
| 2020/0010288 A1 | 1/2020 | McMurrough et al. |
| 2020/0039747 A1 | 2/2020 | Ahmann et al. |
| 2020/0148488 A1 | 5/2020 | Stenson |
| 2020/0165074 A1 | 5/2020 | Wagner et al. |
| 2020/0171650 A1 | 6/2020 | Hallock et al. |
| 2020/0223066 A1* | 7/2020 | Diankov ............ G06Q 10/087 |
| 2020/0234071 A1 | 7/2020 | Yuvaraj et al. |
| 2020/0270076 A1 | 8/2020 | Geyer et al. |
| 2020/0276713 A1 | 9/2020 | Zhang et al. |
| 2020/0324986 A1 | 10/2020 | McMurrough et al. |
| 2020/0394747 A1* | 12/2020 | Chatterjee ................. G06T 7/70 |
| 2021/0122589 A1 | 4/2021 | Griggs |
| 2021/0171295 A1 | 6/2021 | Azuma et al. |
| 2021/0198090 A1* | 7/2021 | Bando ..................... B66F 9/063 |
| 2021/0237986 A1 | 8/2021 | Wagner et al. |
| 2021/0363770 A1 | 11/2021 | Lindbo et al. |
| 2022/0041383 A1 | 2/2022 | Krishnamoorthy et al. |
| 2022/0080584 A1 | 3/2022 | Wicks et al. |
| 2022/0097243 A1 | 3/2022 | Makhal et al. |
| 2022/0144561 A1 | 5/2022 | Geyer et al. |
| 2022/0185602 A1 | 6/2022 | Stenson |
| 2023/0104427 A1 | 4/2023 | Allen et al. |
| 2023/0105141 A1 | 4/2023 | Allen et al. |
| 2023/0106508 A1 | 4/2023 | Allen et al. |
| 2023/0106572 A1 | 4/2023 | Allen et al. |
| 2023/0134924 A1 | 5/2023 | Sun et al. |
| 2023/0150137 A1 | 5/2023 | Sun et al. |
| 2023/0158676 A1 | 5/2023 | Sun et al. |
| 2023/0271323 A1 | 8/2023 | Sun et al. |
| 2023/0271797 A1 | 8/2023 | Sun et al. |
| 2024/0174454 A1 | 5/2024 | Allen et al. |

FOREIGN PATENT DOCUMENTS

| | | | | |
|---|---|---|---|---|
| CA | 3046214 C | 1/2022 | | |
| CA | 3139255 C | 7/2023 | | |
| CA | 3139267 C | 7/2023 | | |
| CA | 3139272 C | 7/2023 | | |
| CN | 201473275 U | * | 5/2010 | |
| CN | 104743367 A | | 7/2015 | |
| CN | 105905019 A | | 8/2016 | |
| CN | 205500186 U | | 8/2016 | |
| CN | 106167180 A | | 11/2016 | |
| CN | 106629098 A | | 5/2017 | |
| CN | 209684850 U | | 11/2019 | |
| CN | 118055897 A | | 5/2024 | |
| CN | 118055898 A | | 5/2024 | |
| CN | 118076549 A | | 5/2024 | |
| CN | 118103313 A | | 5/2024 | |
| CN | 118343648 A | * | 7/2024 | .......... B66F 9/07559 |
| DE | 19510392 A1 | | 9/1996 | |
| DE | 102004001181 A1 | | 8/2005 | |
| DE | 102007023909 A1 | | 11/2008 | |
| DE | 102007024670 A1 | | 12/2008 | |
| DE | 102010033115 A1 | | 2/2012 | |
| DE | 102011083095 A1 | | 3/2013 | |
| DE | 102014111396 A1 | | 2/2016 | |
| EP | 0235488 A1 | | 9/1987 | |
| EP | 0613841 A1 | | 9/1994 | |
| EP | 0767113 A2 | | 4/1997 | |
| EP | 1223129 A1 | | 7/2002 | |
| EP | 1695927 A2 | | 8/2006 | |
| EP | 1995192 A2 | | 11/2008 | |
| EP | 2055654 A1 | | 5/2009 | |
| EP | 2152617 B1 | | 10/2011 | |
| EP | 2500150 A2 | * | 9/2012 | .......... B25J 15/0019 |
| EP | 2650237 A1 | | 10/2013 | |
| EP | 2745982 A2 | | 6/2014 | |
| EP | 2937299 A1 | | 10/2015 | |
| EP | 3006379 A2 | | 4/2016 | |
| EP | 3112295 A1 | | 1/2017 | |
| EP | 3623324 A1 | | 3/2020 | |
| FR | 1457450 A | | 1/1966 | |
| FR | 2832654 A1 | | 5/2003 | |
| GB | 2084531 A | | 4/1982 | |
| GB | 2507707 A | | 5/2014 | |
| JP | S54131278 A | | 10/1979 | |
| JP | S63310406 A | | 12/1982 | |
| JP | H0395001 A | | 4/1991 | |
| JP | H08157016 A | | 6/1996 | |
| JP | H05324662 B2 | | 10/2001 | |
| JP | 2002028577 A | | 1/2002 | |
| JP | 2003150230 A | | 5/2003 | |
| JP | 2007182286 A | | 7/2007 | |
| JP | 2008080300 A | | 4/2008 | |
| JP | 2010202291 A | | 9/2010 | |
| JP | 2014141313 A | | 8/2014 | |
| KR | 20160057668 A | | 5/2016 | |
| KR | 101710104 B1 | | 3/2017 | |
| KR | 101847787 B1 | * | 4/2018 | ................ B66F 9/22 |
| WO | 03095339 A1 | | 11/2003 | |
| WO | 2007009136 A1 | | 1/2007 | |
| WO | 2008145223 A1 | | 12/2008 | |
| WO | 2010017872 A1 | | 2/2010 | |
| WO | 2010044044 A1 | | 4/2010 | |
| WO | 2011038442 A2 | | 4/2011 | |
| WO | 2011128384 A1 | | 10/2011 | |
| WO | 2012024714 A2 | | 3/2012 | |
| WO | 2012127102 A9 | | 9/2012 | |
| WO | 2014064592 A2 | | 5/2014 | |
| WO | 2014111483 A1 | | 7/2014 | |
| WO | 2015035300 A1 | | 3/2015 | |
| WO | 2015118171 A1 | | 8/2015 | |
| WO | 2015162390 A1 | | 10/2015 | |
| WO | 2016198565 A1 | | 12/2016 | |
| WO | 2018107000 A1 | | 6/2018 | |
| WO | 2023059485 A1 | | 4/2023 | |
| WO | 2023059636 A1 | | 4/2023 | |

(56)                 References Cited

FOREIGN PATENT DOCUMENTS

WO        2023059828 A1      4/2023
WO        2023059830 A1      4/2024

OTHER PUBLICATIONS

KR101847787 description with paragraph numbers espacenet (Year: 2018).*
CN118343648 EN translation spec espacenet (Year: 2024).*
CN201473275 EN translation spec espacenet (Year: 2010).*
Communication pursuant to Rules 161(1) and 162 EPC issued by the European Patent Office in related European Patent Application No. 22793042.7 on May 15, 2024, 3 pages.
Communication pursuant to Rules 161(1) and 162 EPC issued by the European Patent Office in related European Patent Application No. 22801268.8 on May 15, 2024, 3 pages.
Communication pursuant to Rules 161(1) and 162 EPC issued by the European Patent Office in related European Patent Application No. 22800426.3 on May 15, 2024, 3 pages.
Communication pursuant to Rules 161(1) and 162 EPC issued by the European Patent Office in related European Patent Application No. 22801608.5 on May 15, 2024, 3 pages.
International Preliminary Report on Patentability issued by the International Searching Authority, the European Patent Office, in related International Patent Application PCT/US2022/044927 mailed Apr. 18, 2024, 16 pgs.
International Preliminary Report on Patentability issued by the International Searching Authority, the European Patent Office, in related International Patent Application PCT/US2022/045947 mailed Apr. 18, 2024, 10 pgs.
International Preliminary Report on Patentability issued by the International Searching Authority, the European Patent Office, in related International Patent Application PCT/US2022/045671 mailed Apr. 18, 2024, 14 pgs.
International Preliminary Report on Patentability issued by the International Searching Authority, the European Patent Office, in related International Patent Application PCT/US2022/045943 mailed Apr. 9, 2024, 13 pgs.
Non-Final Office Action issued by the United States Patent and Trademark Office in related U.S. Appl. No. 18/384,976 on Jul. 1, 2024, 16 pages.
Annex to Form PCT/ISA/206 (Partial Search) issued by the International Searching Authority (the European Patent Office) in related international application No. PCT/US2022/045671 on Jan. 30, 2023, xx pages.
Annex to Form PCT/ISA/206 (Partial Search) issued by the International Searching Authority (the European Patent Office) in related international application No. PCT/US2022/045943 on Jan. 30, 2023, xx pages.
Cipolla et al., "Visually Guided Grasping in Unstructured Environments," Journal of Robotics and Autonomous Systems, vol. 19, No. 3-4, Mar. 1, 1997, pp. 337-346.
Communication pursuant to Article 94(3) EPC issued by the European Patent Office in related European Patent Application No. 17826628.4 on Aug. 31, 2022, 7 pages.
Communication pursuant to Rules 161(1) and 162 EPC issued by the European Patent Office on Jul. 16, 2019 in related European Patent Application No. 17826628.4, 3 pages.
Decision on Rejection issued by the China National Intellectual Property Administration, P.R.C in related Chinese Patent Application No. 201780075644.9 on Jun. 23, 2021, 23 pages.
Examiner's Report issued by the Innovation, Sciences and Economic Development Canada in related Canadian Patent Application No. 3,046,214 on May 25, 2020, 4 pages.

Examiner's Report issued by the Innovation, Sciences and Economic Development Canada in related Canadian Patent Application No. 3,046,214 on Jan. 12, 2021, 4 pages.
Final Office Action issued by the U.S. Patent and Trademark Office in related U.S. Appl. No. 15/835,764 on Jun. 11, 2019, 13 pages.
First Office Action, along with its English translation, issued by the National Intellectual Property Administration, P.R.C in related Chinese Patent Application No. 201780075644.9 on May 20, 2020, 11 pages.
International Preliminary Report on Patentability issued by the International Searching Authority, the European Patent Office, in related International Patent Application PCT/US2017/065264 mailed Jun. 11, 2019, 9 pgs.
International Search Report and Written Opinion issued by the International Searching Authority, the European Patent Office, in related International Patent Application PCT/US2017/065264 mailed Mar. 19, 2018, 12 pgs.
Klingbeil et al., "Grasping with Application to an Autonomous Checkout Robot," Journal of Robotics and Automation (ICRA), 2011 IEEE, May 9, 2011, pp. 2837-2844.
Non-Final Office Action issued by the U.S. Patent and Trademark Office in related U.S. Appl. No. 15/835,764 on Sep. 16, 2019, 8 pages.
Non-Final Office Action issued by the United States Patent and Trademark Office in related U.S. Appl. No. 16/776,197 on Sep. 29, 2020, 13 pages.
Non-Final Office Action issued in related U.S. Appl. No. 15/835,764 on Nov. 20, 2018, 10 pages.
Notification of Transmittal of the International Search Report and the Written Opinion of the International Searching Authority and the International Search Report and Written Opinion issued by the International Searching Authority (the European Patent Office) in related international application No. PCT/US2022/044927 on Jan. 27, 2023, 15 pages.
Notification of Transmittal of the International Search Report and the Written Opinion of the International Searching Authority and the International Search Report and Written Opinion issued by the International Searching Authority (the European Patent Office) in related international application No. PCT/US2022/045947 on Feb. 1, 2023, 17 pages.
Second Office Action, along with its English translation, issued by the National Intellectual Property Administration, P.R.C in related Chinese Patent Application No. 201780075644.9 on Jan. 6, 2021, 26 pages.
Notification of Transmittal of the International Search Report and the Written Opinion of the International Searching Authority and the International Search Report and Written Opinion issued by the International Searching Authority (the European Patent Office) in related international application No. PCT/US2022/045671 on Mar. 21, 2023, 24 pages.
Examiner's Report issued by the Innovation, Science and Economic Development Canada (Canadian Intellectual Property Office) in related Canadian Patent Application No. 3,139,261 on May 18, 2023, 4 pages.
Notification of Transmittal of the International Search Report and the Written Opinion of the International Searching Authority and the International Search Report and Written Opinion issued by the International Searching Authority (the European Patent Office) in related international application No. PCT/US2022/045943 on Mar. 21, 2023, 23 pages.
Non-Final Office Action issued by the United States Patent and Trademark Office in related U.S. Appl. No. 17/953,982 on Jul. 3, 2023, 6 pages.
Non-Final Office Action issued by the United States Patent and Trademark Office in related U.S. Appl. No. 17/236,252 on Mar. 10, 2023, 14 pages.

* cited by examiner

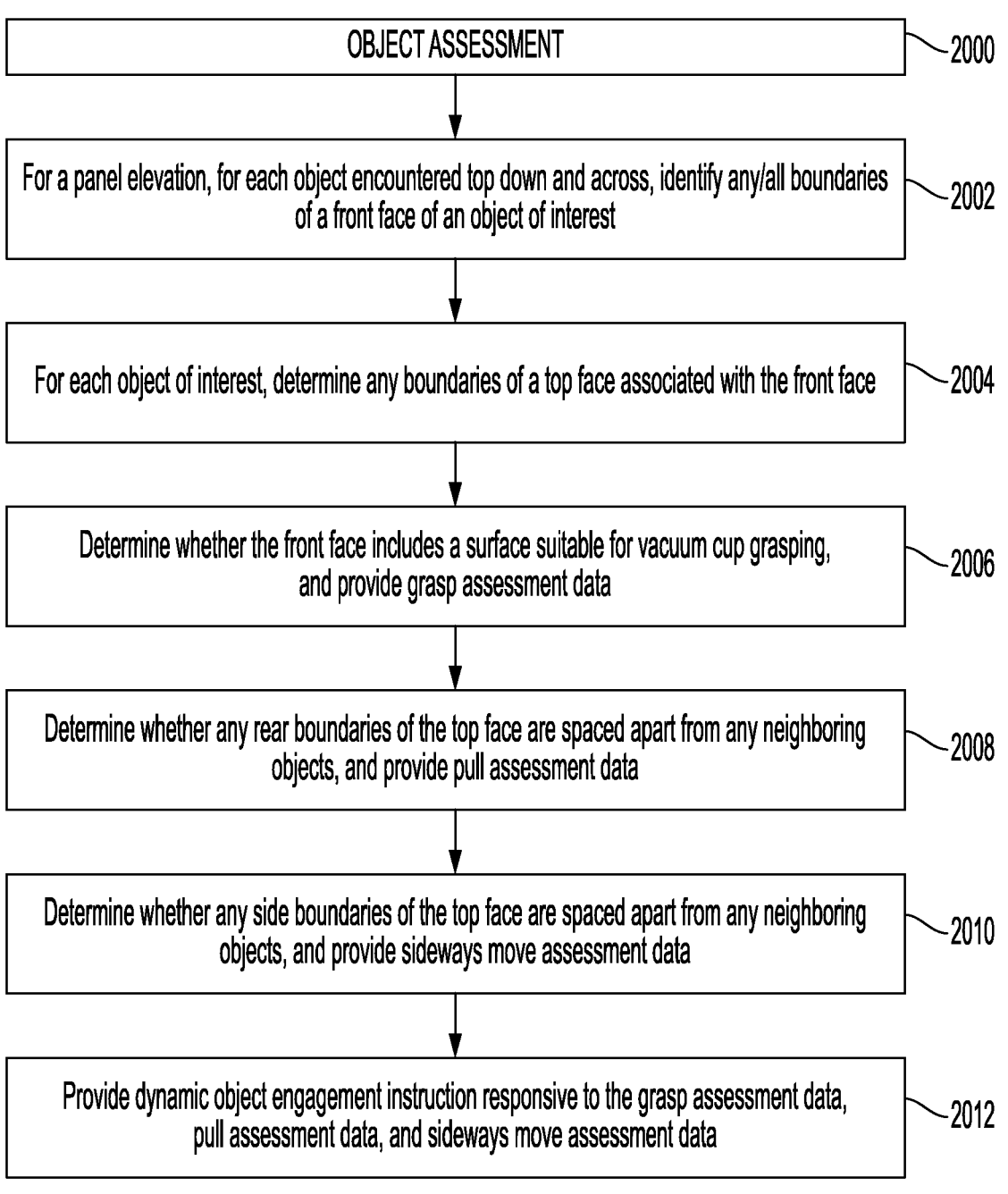

| OBJECT ASSESSMENT | ~2000 |

For a panel elevation, for each object encountered top down and across, identify any/all boundaries of a front face of an object of interest  ~2002

For each object of interest, determine any boundaries of a top face associated with the front face  ~2004

Determine whether the front face includes a surface suitable for vacuum cup grasping, and provide grasp assessment data  ~2006

Determine whether any rear boundaries of the top face are spaced apart from any neighboring objects, and provide pull assessment data  ~2008

Determine whether any side boundaries of the top face are spaced apart from any neighboring objects, and provide sideways move assessment data  ~2010

Provide dynamic object engagement instruction responsive to the grasp assessment data, pull assessment data, and sideways move assessment data  ~2012

FIG. 8

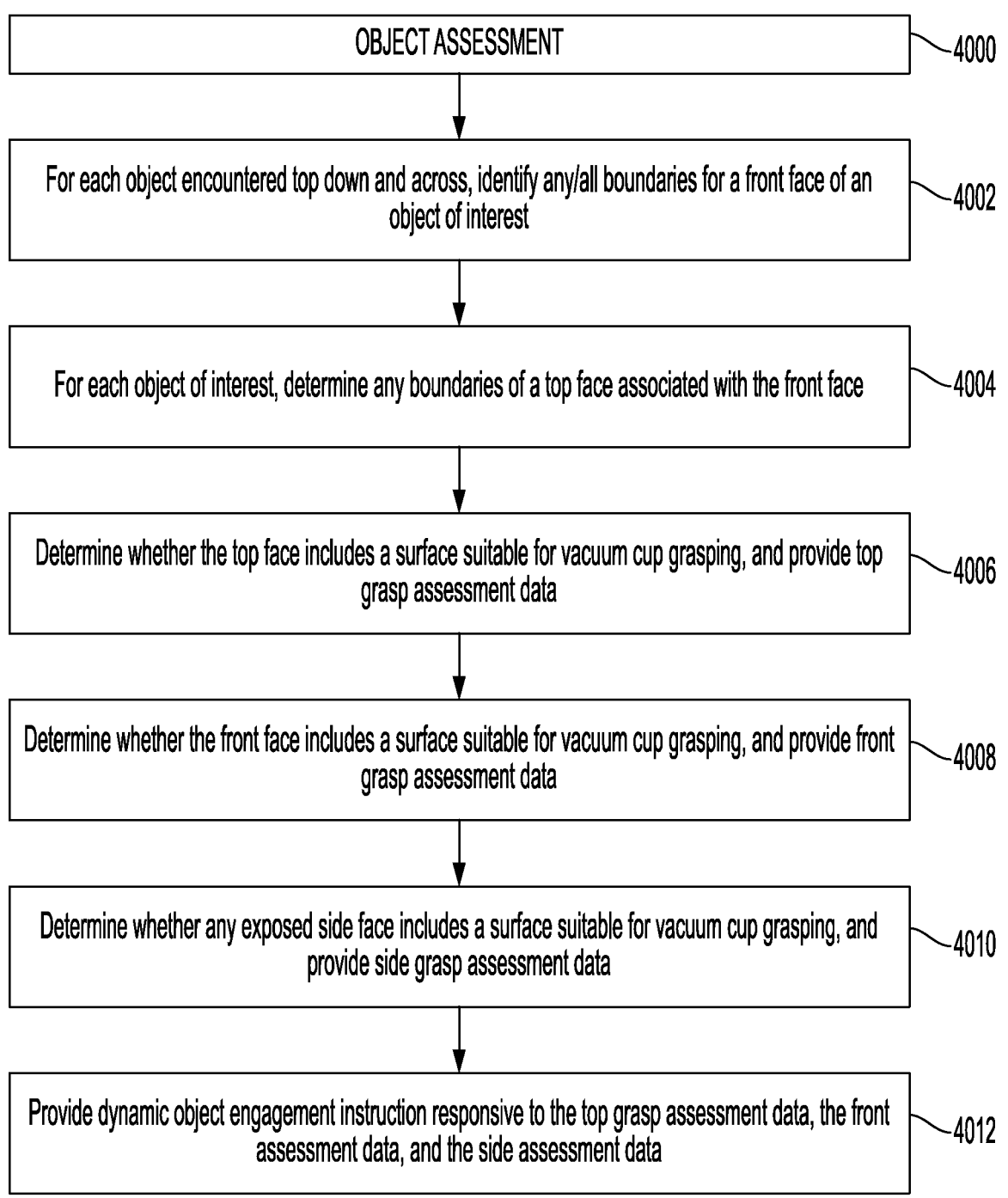

| OBJECT ASSESSMENT | 4000 |

For each object encountered top down and across, identify any/all boundaries for a front face of an object of interest — 4002

For each object of interest, determine any boundaries of a top face associated with the front face — 4004

Determine whether the top face includes a surface suitable for vacuum cup grasping, and provide top grasp assessment data — 4006

Determine whether the front face includes a surface suitable for vacuum cup grasping, and provide front grasp assessment data — 4008

Determine whether any exposed side face includes a surface suitable for vacuum cup grasping, and provide side grasp assessment data — 4010

Provide dynamic object engagement instruction responsive to the top grasp assessment data, the front assessment data, and the side assessment data — 4012

FIG. 16

SYSTEMS AND METHODS FOR DYNAMIC PROCESSING OF OBJECTS PROVIDED IN VEHICLES WITH OBSTRUCTION REMEDIATION

PRIORITY

The present application claims priority to U.S. Provisional Patent Application No. 63/252,807, filed Oct. 6, 2021, and U.S. Provisional Patent Application No. 63/252,811, filed Oct. 6, 2021, the disclosures of which are hereby incorporated by reference in their entireties.

BACKGROUND

The invention generally relates to automated, robotic and other object processing systems such as sortation systems, and relates in particular to automated and robotic systems intended for use in environments requiring, for example, that a variety of objects (e.g., parcels, packages, and articles, etc.) be processed and distributed to several output destinations.

Many parcel distribution systems receive parcels from a vehicle, such as a trailer of a tractor trailer. The parcels are unloaded and delivered to a processing station in a disorganized stream that may be provided as individual parcels or parcels aggregated in groups such as in bags, and may be provided to any of several different conveyances, such as a conveyor, a pallet, a Gaylord, or a bin. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels from the vehicle has traditionally been done, at least in part, by human workers that unload the vehicle, then scan the parcels, e.g., with a hand-held barcode scanner, and then place the parcels at assigned locations. For example many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the object, and then places the object in the so-determined bin or shelf location where all objects for that order have been defined to belong. Automated systems for order fulfillment have also been proposed, but such systems still require that objects be first removed from a vehicle for processing if they arrive by vehicle.

Such systems do not therefore, adequately account for the overall process in which objects are first delivered to and provided at a processing station by a vehicle such as a trailer of a tractor trailer. Additionally, many processing stations, such as sorting stations for sorting parcels, are at times, at or near full capacity in terms of available floor space and sortation resources, and there is further a need therefore for systems to unload vehicles and efficiently and effectively provide an ordered stream of objects.

SUMMARY

In accordance with an aspect, the invention provides an object processing system for facilitating removal of objects from a trailer of a tractor trailer. The object processing system includes an object obstruction detection system for identifying an obstruction during removal of objects, a force application system for applying any of a plurality of defined forces to the obstruction, an assessment system for collecting force feedback information responsive to the application of force to the obstruction and providing assessment information, and a control system for providing a removal model for removing the obstruction based on the assessment information.

In accordance with another aspect, the invention provides a method of facilitating removal of objects from a trailer of a tractor trailer. The method includes identifying an obstruction during removal of objects within the trailer, applying any of a plurality of defined forces to the obstruction, collecting force feedback information responsive to the application of force to the obstruction and providing assessment information, and providing a removal model for removing the obstruction based on the assessment information.

In accordance with a further aspect, the invention provides an obstruction assessment system for assessing an obstruction within a trailer of a tractor trailer. The obstruction assessment system includes a force application system for applying a plurality of defined forces to an obstruction said plurality of forces including forces with a defined axis wherein the axes are mutually orthogonal, an assessment system for collecting force feedback information responsive to the application of force to the obstruction and providing assessment information, and a control system for providing a removal model for removing the obstruction based on the assessment information.

BRIEF DESCRIPTION OF THE DRAWINGS

The following description may be further understood with reference to the accompanying drawings in which:

FIG. 8 shows an illustrative diagrammatic functional flow diagram of an object assessment routine in a system in accordance with an aspect of the present invention;

FIG. 16 shows an illustrative diagrammatic flow diagram of an object assessment system in accordance with a further aspect of the present invention;

The drawings are shown for illustrative purposes only.

DETAILED DESCRIPTION

Figure 1:
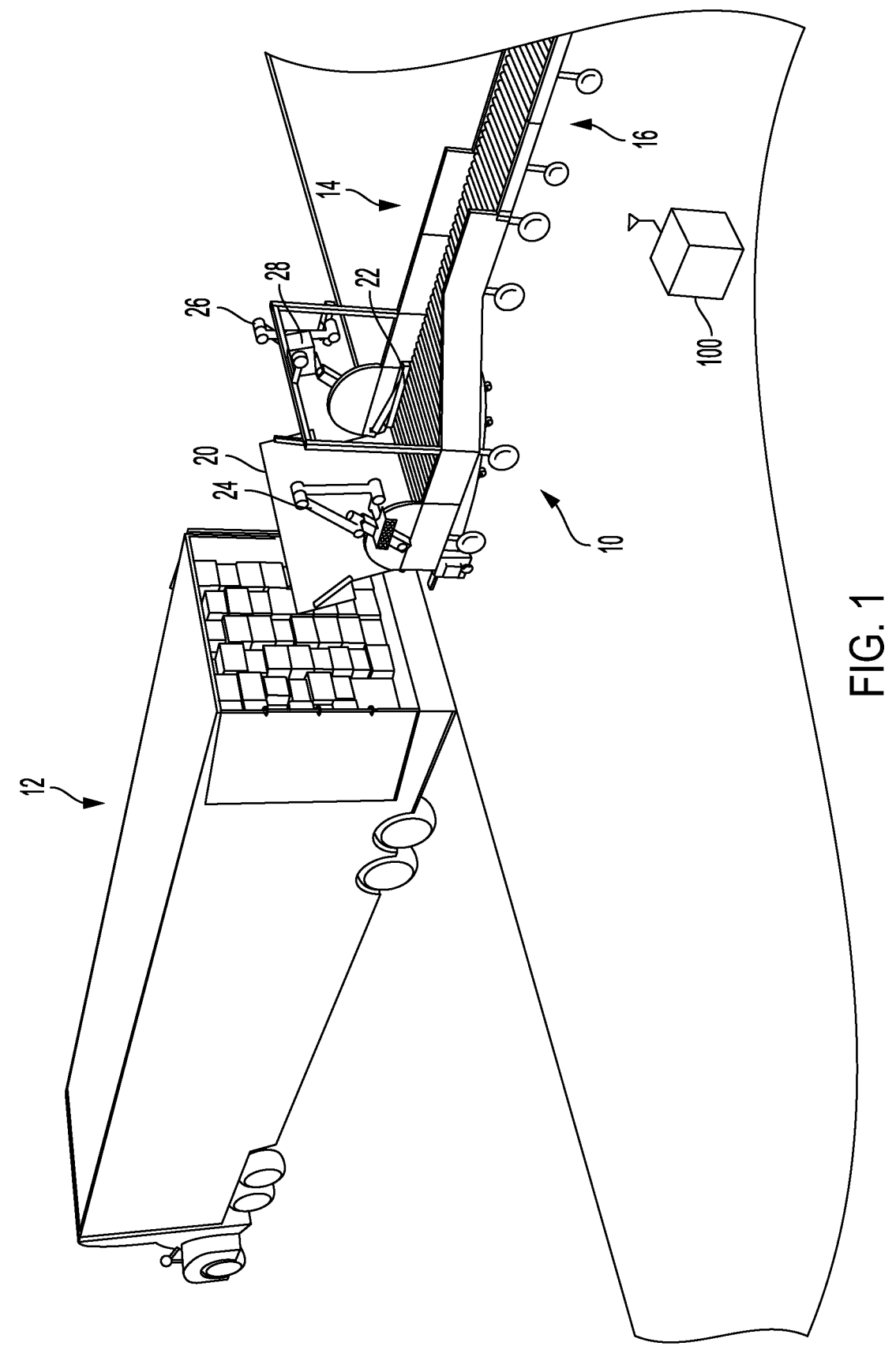
FIG. 1 shows an illustrative diagrammatic view of an object processing system in accordance with an aspect of the present invention.

In accordance with various aspects, the invention provides a dynamic engagement system for engaging objects within a trailer of a tractor trailer. With reference for example to FIG. 1, a dynamic engagement system 10 may engage objects within a trailer 12, and include a chassis 14 that couples to a warehouse conveyor 16 via couplings 18. The chassis 14 (and the conveyor 16) are movable on wheels for permitting the engagement system 10 to enter into (and back out of) the trailer 12. The wheels on the chassis 14 are powered and the control system is remotely coupled to one or more computer processing systems 100.

Figure 2:
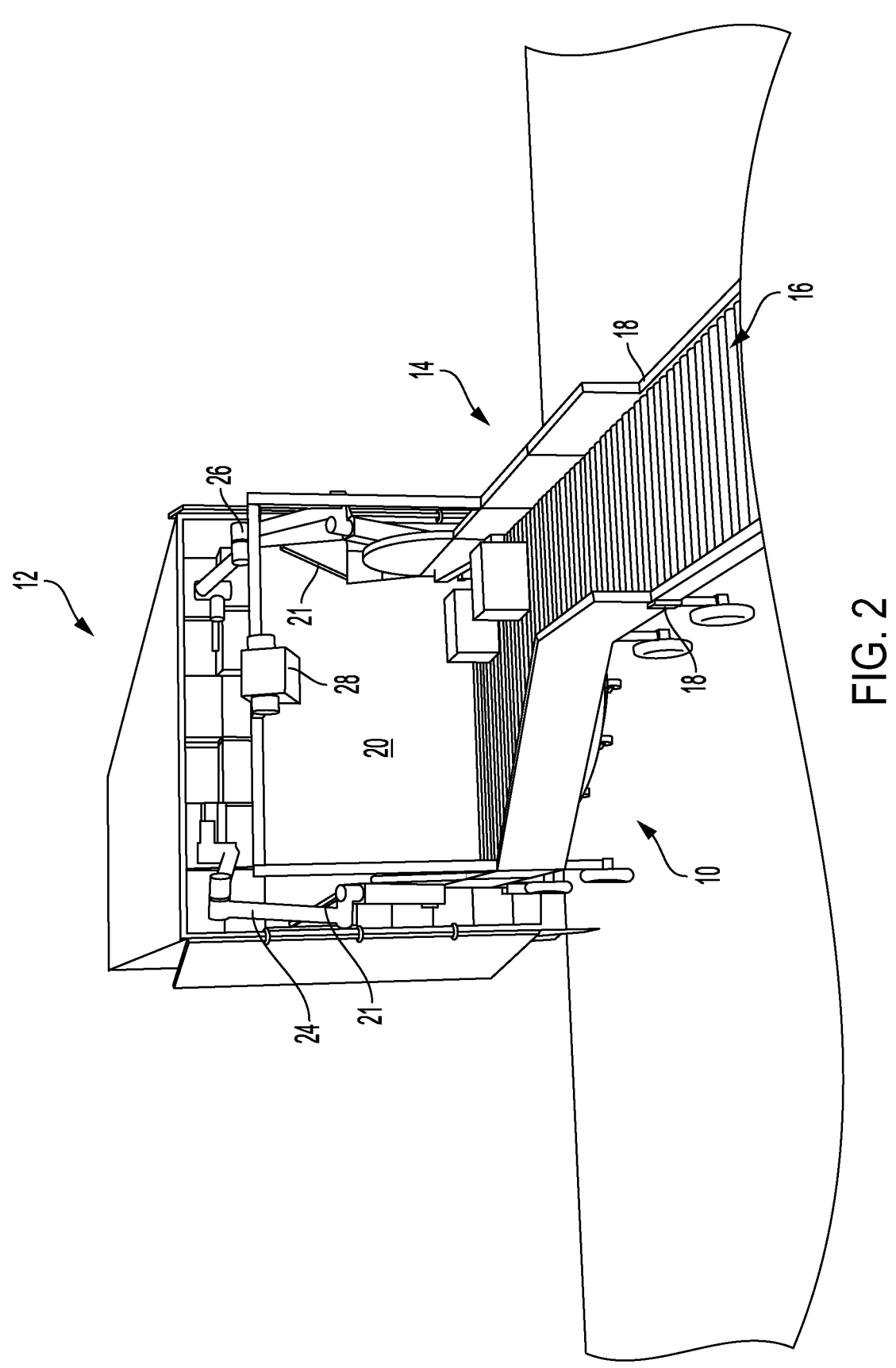
FIG. 2 shows an illustrative diagrammatic end view of the object processing system of FIG. 1.

With further reference to FIG. 2, the dynamic engagement system includes a collection panel 20 that may be pivoted about its bottom edge to facilitate drawing objects from within the trailer 12 onto the conveyor chassis 14. In particular, an upper edge of the collection panel 20 may be positioned adjacent an upper level of a stack of objects within the trailer using one or more powered rotational assist units 22 (e.g., two on each side as further shown in FIG. 14). Each assist unit 22 may also include force torque sensor feedback for measuring any forces acting on the panel 20. The powered rotational assist units 22 rotate the panel upward and downward about an axis 19 at the bottom of the panel 20 (shown in FIG. 10A). Using for example, the force torque sensor feedback, the system may lower the panel toward a stack of objects, detect that the panel has made contact with the stack, and may remain in position or back up a small distance until the panel is no longer contacting the stack of objects. Once the panel 20 is positioned adjacent a stack of objects (e.g., just below a top row of a stack of objects), two articulated arms 24, 26 are employed adjacent the panel to urge objects from the stack onto the panel 20 (which may include one or more guides 21).

Figure 3:
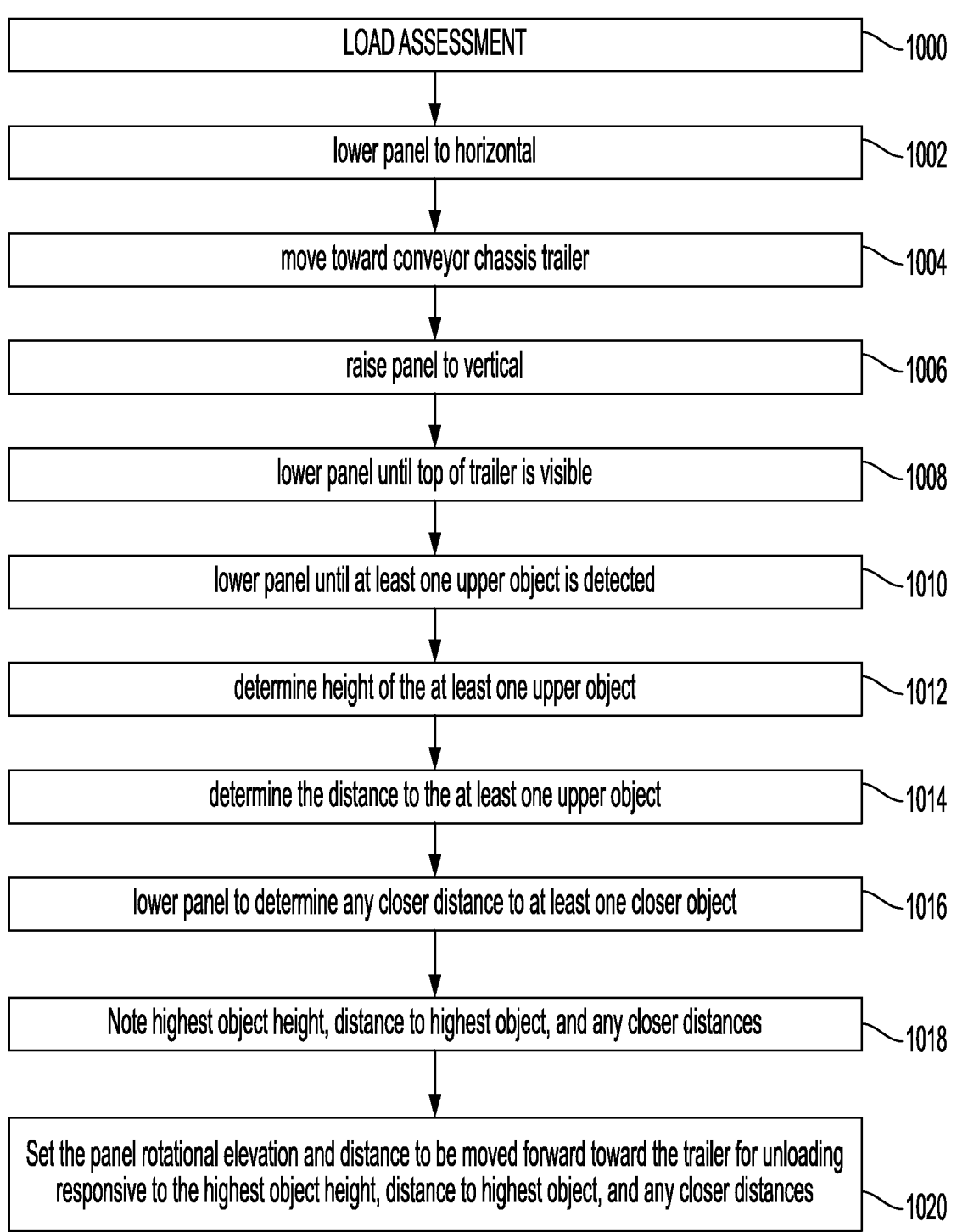
FIG. 3 shows an illustrative diagrammatic functional flow diagram of a load assessment routine in a system in accordance with an aspect of the present invention.

Initially, the load of objects within a trailer may be assessed. With reference to FIG. 3, a load assessment routine may begin (step 1000) by lowering the panel 20 to a position that is approximately horizontal (step 1002), the conveyor chassis 14 may move toward the trailer (step 1004), and the panel may be then raised to a generally vertical position (step 1006). This may ensure that the dynamic engagement system does not begin too close to the objects. The panel is then lowered until the top of the trailer is visible (step 1008), and then continued to be lowered until at least one upper object is detected (step 1010). Distance and position detection sensors in the perception unit 28 are then used to determine a height of the at least one upper object (step 1012) as well as a distance to the at least one upper object (step 1014). The panel is then further lowered to determine whether (and if so where) any lower objects are provided in the trailer that are closer in distance to the dynamic engagement system than the at least one upper object (step 1016). The highest object height, distance to the highest object, and distances to any closer objects are noted (step 1018), and the system them sets the panel rotation elevation and distance to be moved forward toward the trailer for unloading responsive to the highest object height, distance to the highest object, and distances to any closer objects (step 1020). In particular, the panel is positioned to be near but below the closest and highest objects so that programmable motion devices (e.g., articulated arms) may be used to urge objects onto the panel 20, from which the objects will be guided along conveyor section 14 to warehouse conveyor 16.

Figure 4:
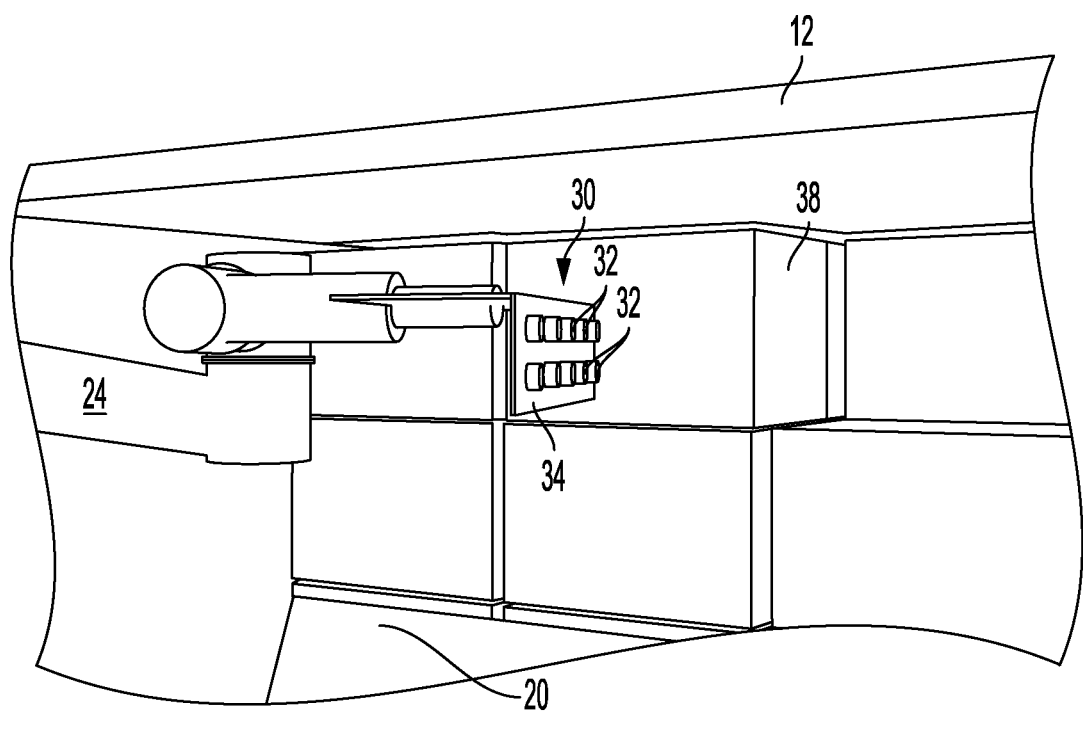
FIG. 4 shows an illustrative diagrammatic enlarged view of a dual-purpose tool in the object processing system of FIG. 1 showing a pull side of the tool.
Figure 5:
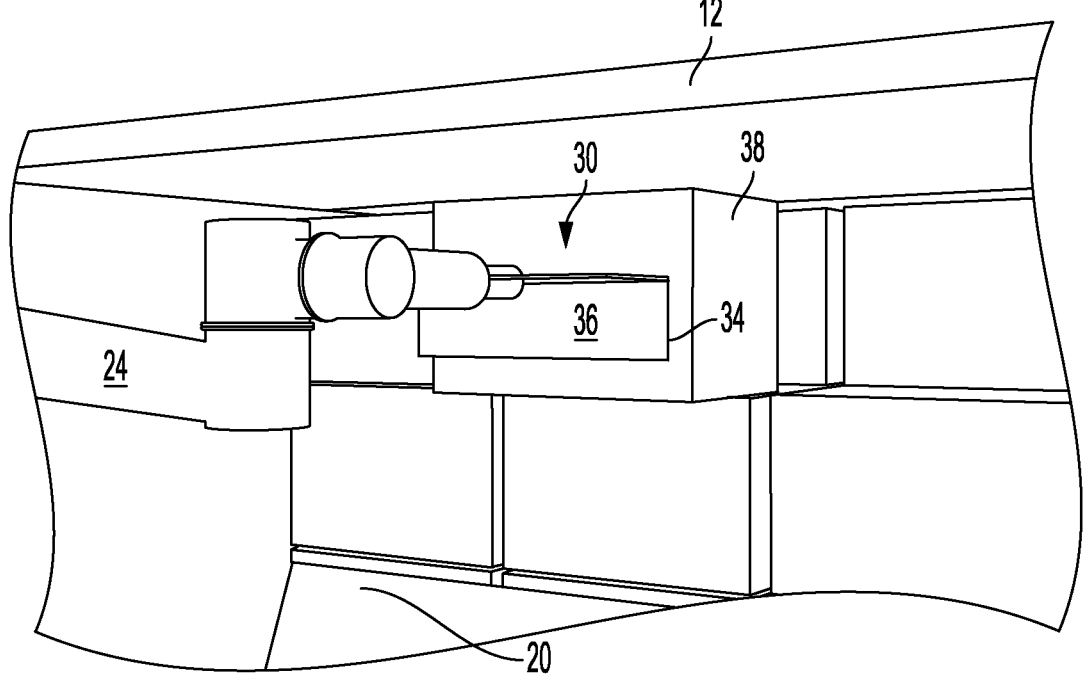
FIG. 5 shows an illustrative diagrammatic enlarged view of the dual-purpose tool in the object processing system of FIG. 4 showing the pull side of the tool engaging an object.
Figure 6:
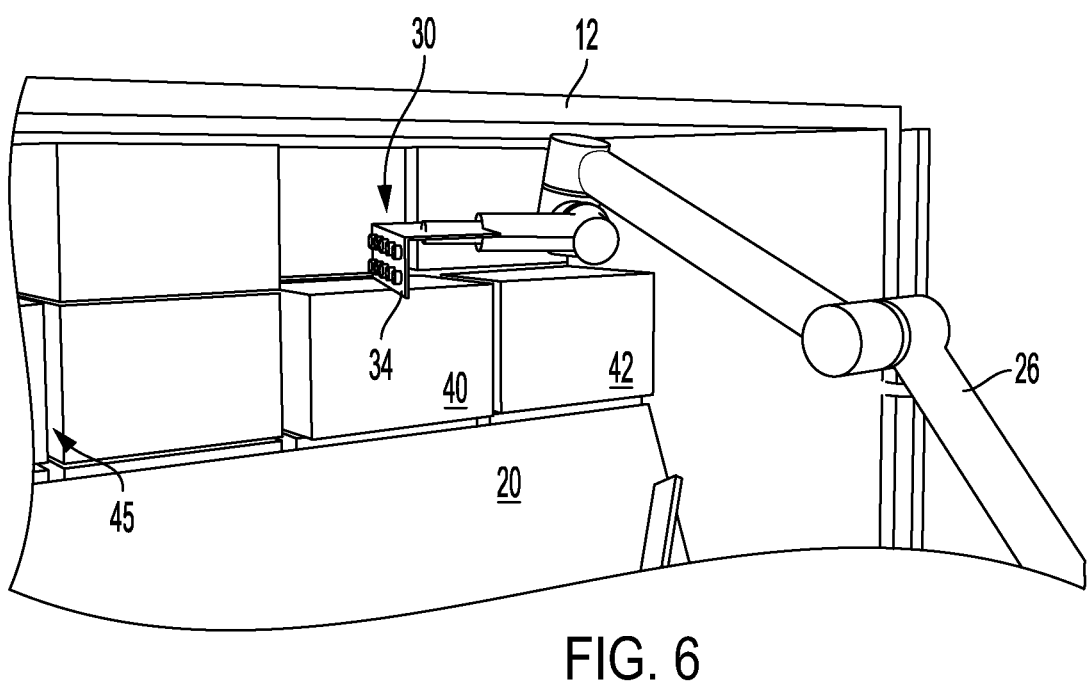
FIG. 6 shows an illustrative diagrammatic enlarged view of a dual-purpose tool in the object processing system of FIG. 1 showing a rake side of the tool.
Figure 7:
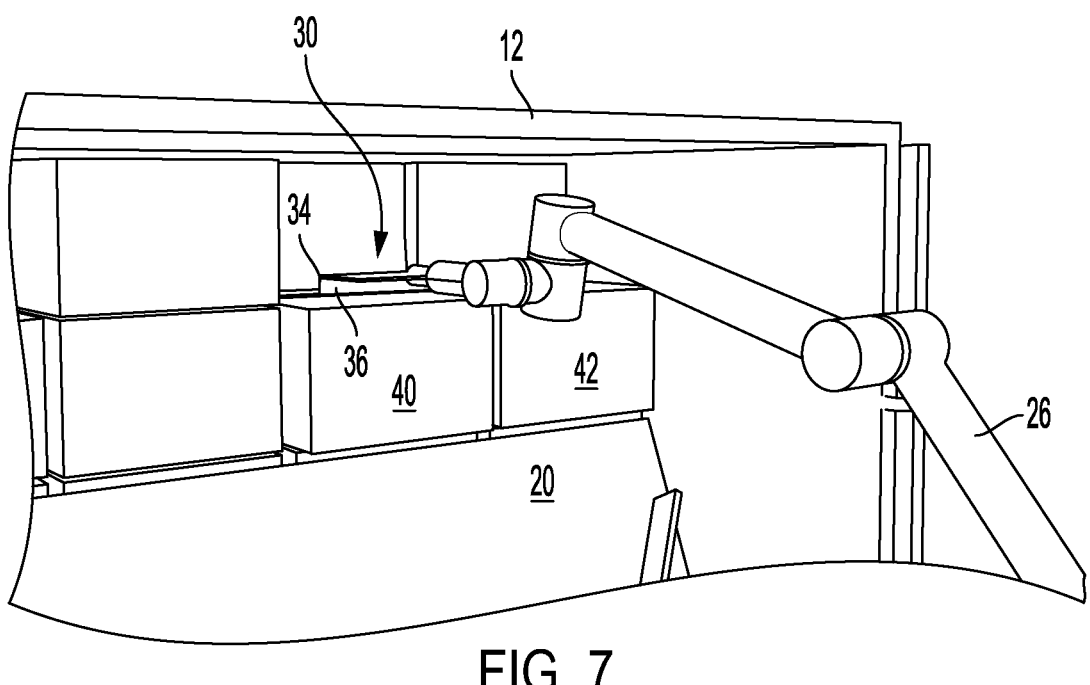
FIG. 7 shows an illustrative diagrammatic enlarged view of the dual-purpose tool in the object processing system of FIG. 4 showing the rake side of the tool engaging an object.

Each articulated arm 24, 26 may include a multi-purpose end effector 30 that includes a retrieving tool 34, a distal side of which includes one or more vacuum cups 32 coupled to a vacuum source, and a proximal side 36 that may be used to pull objects over an upper edge of the collection panel 20. In particular, FIG. 4 shows a plurality of vacuum cups 32 on one side of the tool 34. The vacuum cups are employed (with vacuum from a vacuum source) to grasp objects and pull them over the upper edge of the collection panel 20 as shown in FIG. 5. The object (e.g., 38 may then be dropped onto the collection panel by turning off the vacuum to the cups 32. FIG. 6 shows the multi-purpose end effector 30 of the articulated arm 26 (again with the vacuum cups 32 on the tool 34), and FIG. 7 shows the second side 36 of the tool 34 used to pull one or more objects (e.g., 40, 42) over the upper edge of the collection panel 20 and onto which they fall, optionally guided by one or more guides 21.

Figures 9A, 9B:
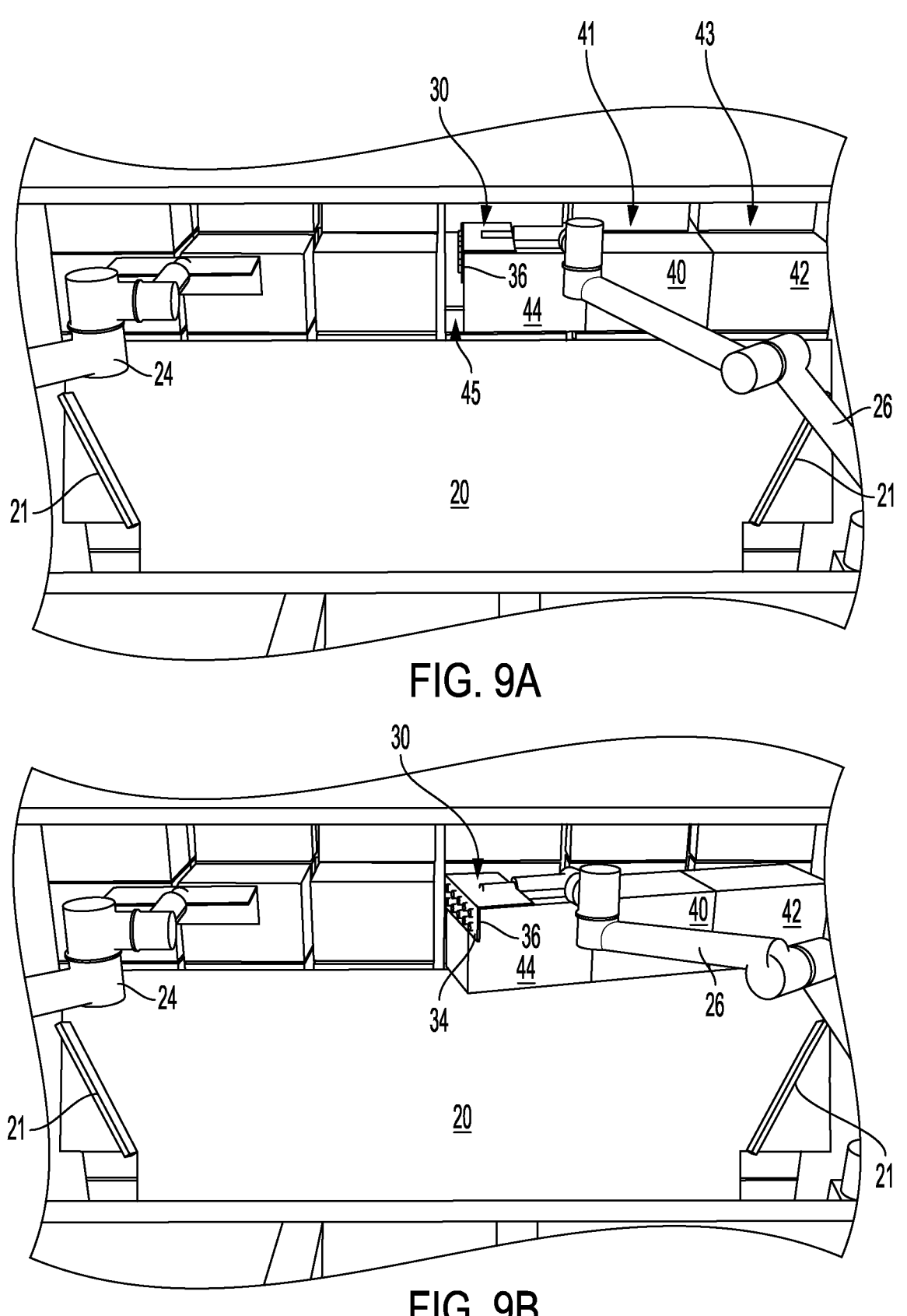
FIGS. 9A and 9B show illustrative diagrammatic end views of the object processing system of FIG. 1 with the end-effector engaging a plurality of objects in a cross-direction (FIG. 9A), and moving the engaged plurality of objects by rotation (FIG. 9B)

A side of an object may also be engaged to dislodge one or more objects from a stack or set of objects onto the panel. For example, FIG. 9A shows the side 36 of the end effector tool 34 engaging an object 44 from a side of the object. The side of the object 44 may have been associated with having an opening (e.g., 45) adjacent a side of the object 44. Once engaged, the object 44 may be moved sideways by the tool 34, and then rotated toward the articulated arm to draw the object(s) over the panel 20. FIG. 9A shows the tool 34 engaging not only the object 44 but also objects 40 and 42, and urging all three objects against each other and against an inner wall of the trailer. FIG. 9B shows all three objects 40, 42, 44 being rotated over the panel 20 such that the objects will fall onto the collection panel 20, optionally engaging guides 21, to be collected by the conveyor 14.

Once the panel is positioned, each facing object is assessed. In particular for example and with reference to FIG. 8, an object assessment routine may begin (step 2000) by evaluating object boundaries. For a panel elevation, for each object encountered top down and across, all boundaries of a front face of each object of interest are identified (step 2002). For each object of interest, the system will also determine any boundaries of a top face associated with the front face (step 2004). With this information, the system may determine whether the front face includes a surface suitable for vacuum cup grasping, and provide grasp assessment data (step 2006). The system may also determine whether any rear boundaries of the top face are spaced apart from any neighboring objects, and provide pull assessment data (step 2008). Additionally, the system may determine whether any side boundaries of the top face are spaced apart from any neighboring objects, and provide sideways move assessment data (step 2010). The system may then provide dynamic object engagement instructions responsive to the grasp assessment data, the pull assessment data, and the sideways move assessment data (step 2012).

The top edge 23 of the panel 20 should be positioned to permit objects (e.g., 38, 40, 42) to be moved over the panel 20 so that they may be dropped onto the panel (and thereby urged along the chassis conveyor 14 to the warehouse conveyor 16). The objects may generally be removed from top to bottom of an exposed stack of objects. As the objects are removed (and provided onto the panel 20), the panel is lowered to receive further objects. The panel 20 may be lowered, by pivoting the panel (using the assist unit(s) 22) that rotate the panel with respect to a bottom edge thereof, as well as the powered wheels of the chassis 14 that move the dynamic engagement system backward to accommodate the lowering of the panel (as it rotates). In this way, a lower portion of the exposed stack of objects may be processed, and when further lowered and moved as discussed above, a still further lower portion of the exposed stack of objects may be processed.

Control of the rotation of the panel 20 about the axis 19 at the bottom of the panel 20, is provided by the panel assist units 22, each of which includes, for example, an offset pair of actuators 70, 72. Each actuator 70, 72 is offset from the axis 80 by a small difference, and the combination of the movement of the actuators (in cooperation with the actuators 70, 72 on the other side of the engagement system 10) causes the panel 20 to be rotated upward or downward with respect to the conveyor of the chassis 14. One or each of the actuators may further include force torque sensors that measure any forces acting on the panel 20 other than gravity.

The objects may thereby be removed from the trailer using the articulated arms 24, 26 to moved objects onto the panel 20 as the panel travels (rotationally and linearly) through the trailer. When the perception system 28 detects that an opening (e.g., at 41, 43) may exist behind objects (e.g., 40, 42) sufficient to receive at least part of a tool 34 of an end effector 30, the system may position a tool of an end effector behind the object such that the second side 36 of the tool 34 may be used to pull one or more objects over the panel 20. Similarly, if an opening is determined to exist adjacent a side face of an object, the system may position a tool of an end effector adjacent the object such that the second side 36 of the tool may be used to urge one or more objects over the panel 20. If an object cannot be moved (or for example cannot be grasped or the end effector tool 34 may not be able to get behind the object), then the system will note this and move on to another object.

Movement of the dynamic engagement system is provided through the one or more processing systems 100 in communication with the perception system 28, the articulated arms 24 26, the rotational assist units providing rotation and the conveyor wheels actuators (e.g., 15) providing linear movement.

Figure 10A:
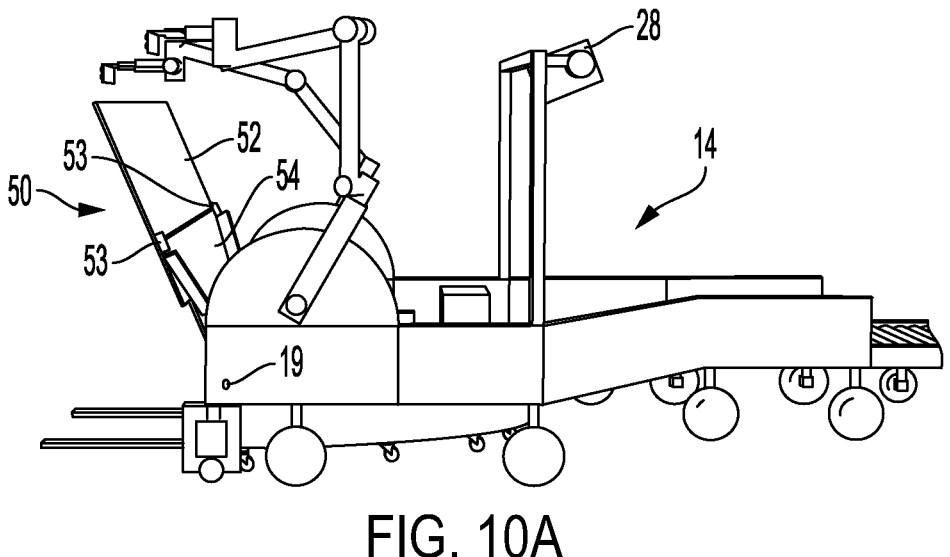
FIGS. 10A and 10B show illustrative diagrammatic side views of the object processing system in accordance with another aspect of the present invention that includes a folding two sub-panel collection panel shown in an elevated position (shown in FIG. 10A) and in a lowered position (shown in FIG. 10B)
Figure 10B:
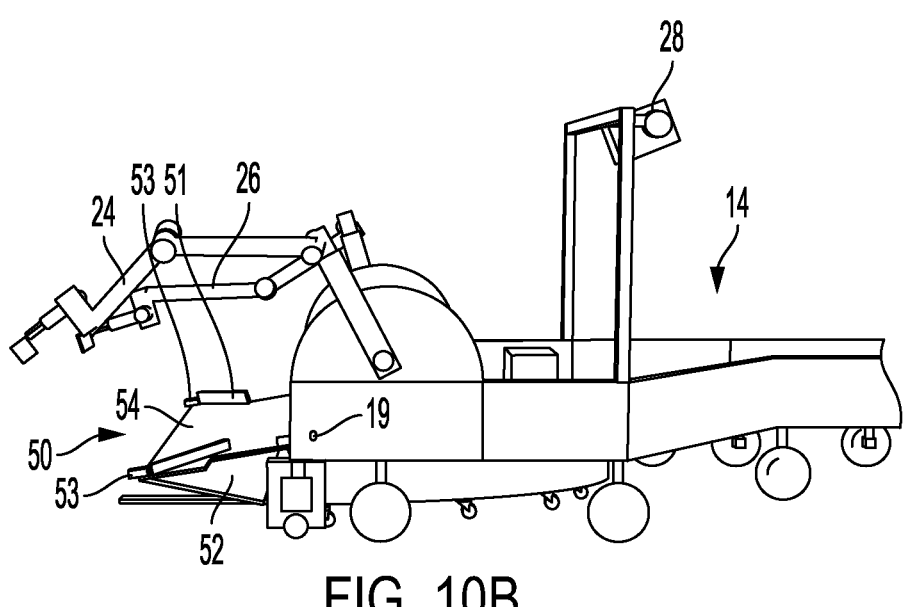

In accordance with further aspects, the collection panel may include sub-panels that may be rotatable with respect to one another such that the panel may be collapsed when it is lowered toward the floor of the trailer. This may facilitate reaching objects without extending the articulated arms 24, 26 significant distances to clear the edge of the collection panel. For example, FIG. 10A shows an object processing system that includes a collection panel 50 with two sub-panels 52, 54. When extended to an upper elevation, the sub-panels are maintained in an extended position (end-to-end) by actuators 53. The panel 50 may include guides 51 to facilitate dropping objects onto the chassis 14. When the actuators 53 release the upper sub-panel 52, it will swing under and be captured on the underside of the sub-panel 54, leaving only the sub-panel to extend toward the objects within the trailer. The outer edge of the sub-panel 54 is therefore now the leading edge of the collection panel 50, permitting the articulated arms 24, 26 to not be required to reach as far away from the chassis 14. FIG. 10A shows a side view of the collection panel 50 in the elevated position, and FIG. 10B shows the collection panel 50 in the folded and lowered position.

Figure 11A:
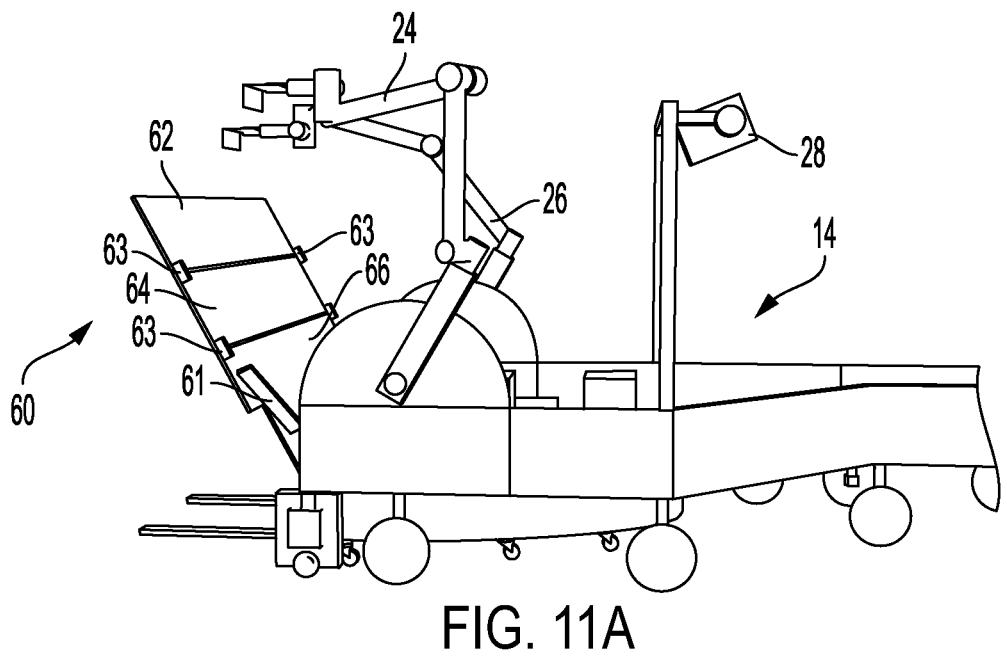
FIGS. 11A and 11B show illustrative diagrammatic side views of the object processing system in accordance with a further aspect of the present invention that includes a folding three sub-panel collection panel shown in an elevated position (shown in FIG. 11A) and in a lowered position (shown in FIG. 11B)
Figure 11B:
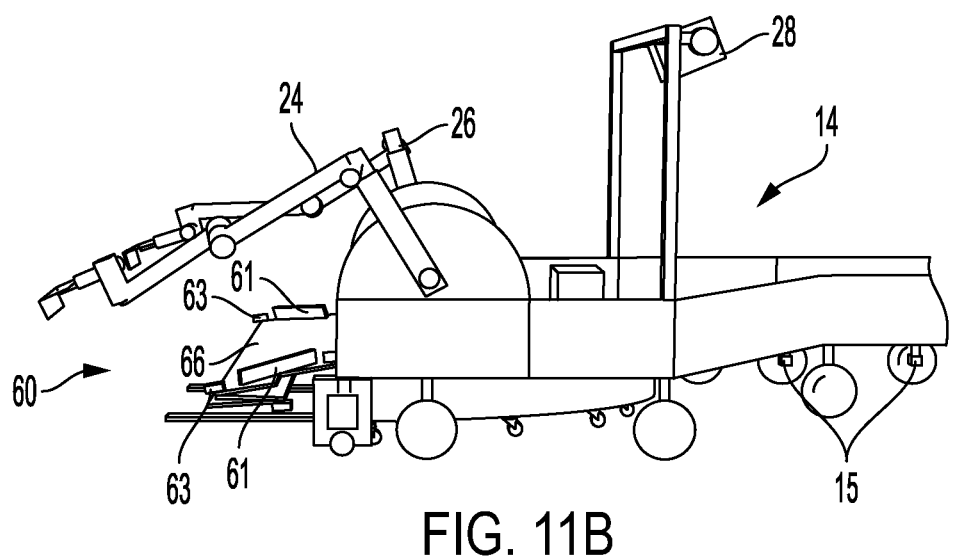

The collection panel may include any number of such folding sub-panels. FIGS. 11A and 11B show side views of an object processing system with a collection panel 60 that includes three sub-panels 62, 64, 66. FIG. 11A shows the collection panel 60 in an elevated position with each sub-panel 62, 64, 66 extending end-to-end, and FIG. 11B shows the collection panel 60 with the sub-panel 62 folded with respect to the sub-panel 64, and the sub-panel 64 folded with respect to the sub-panel 66. In FIG. 11B, the panel assembly is in a lowered position such that the outer edge of the sub-panel 66 is the leading edge of the collection panel 60, permitting the articulated arms 24, 26 to not be required to reach as far away from the chassis 14.

Figure 12A:
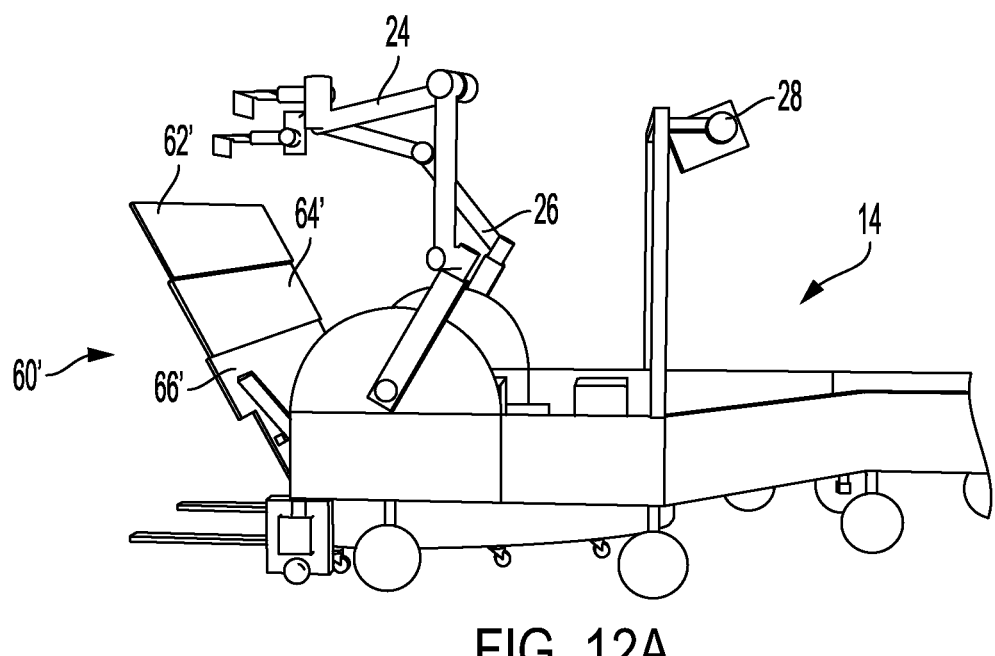
FIGS. 12A and 12B show illustrative diagrammatic side views of the object processing system in accordance with a further aspect of the present invention that includes a telescoping multi-panel collection panel shown in an elevated position (shown in FIG. 12A) and in a lowered position (shown in FIG. 12B)
Figure 12B:
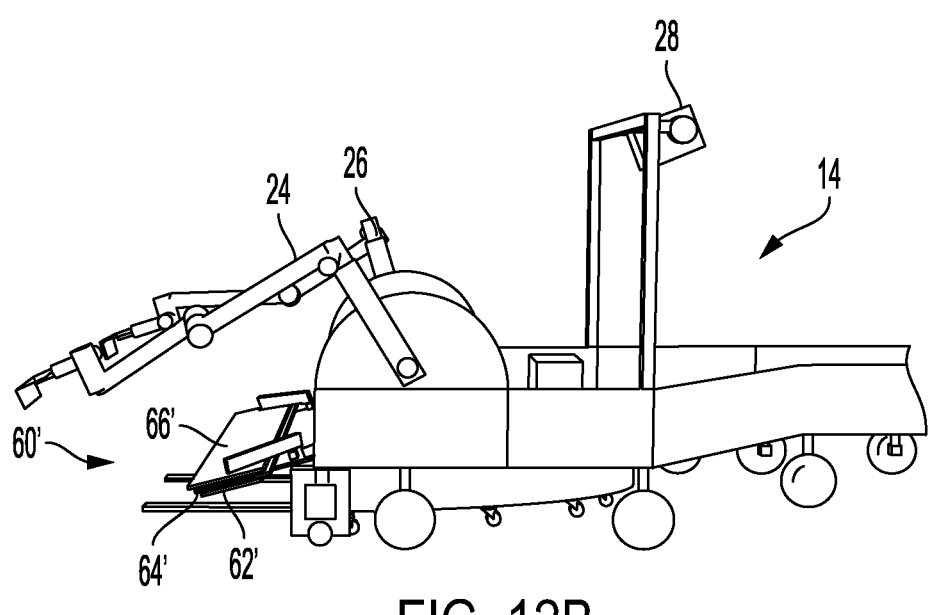

The collection panel may further include any number of telescoping sub-panels. FIGS. 12A and 12B show side views of an object processing system with a collection panel 60' that includes multiple telescoping sub-panels 62', 64', 66'. FIG. 12A shows the collection panel 60' in an elevated position with each sub-panel 62', 64', 66' extending end-to-end, and FIG. 12B shows the collection panel 60' with the sub-panels 62', 64', 66' collapsed in a telescoping manner. Any guides, e.g., 61', are mounted in stand-offs with sufficient clearance to permit the sub-panels to be drawn together. In FIG. 12B, the panel assembly is in a lowered position such that the outer edge of the sub-panel 66' is the leading edge of the collection panel 60', permitting the articulated arms 24, 26 to not be required to reach as far away from the chassis 14.

Figure 13:
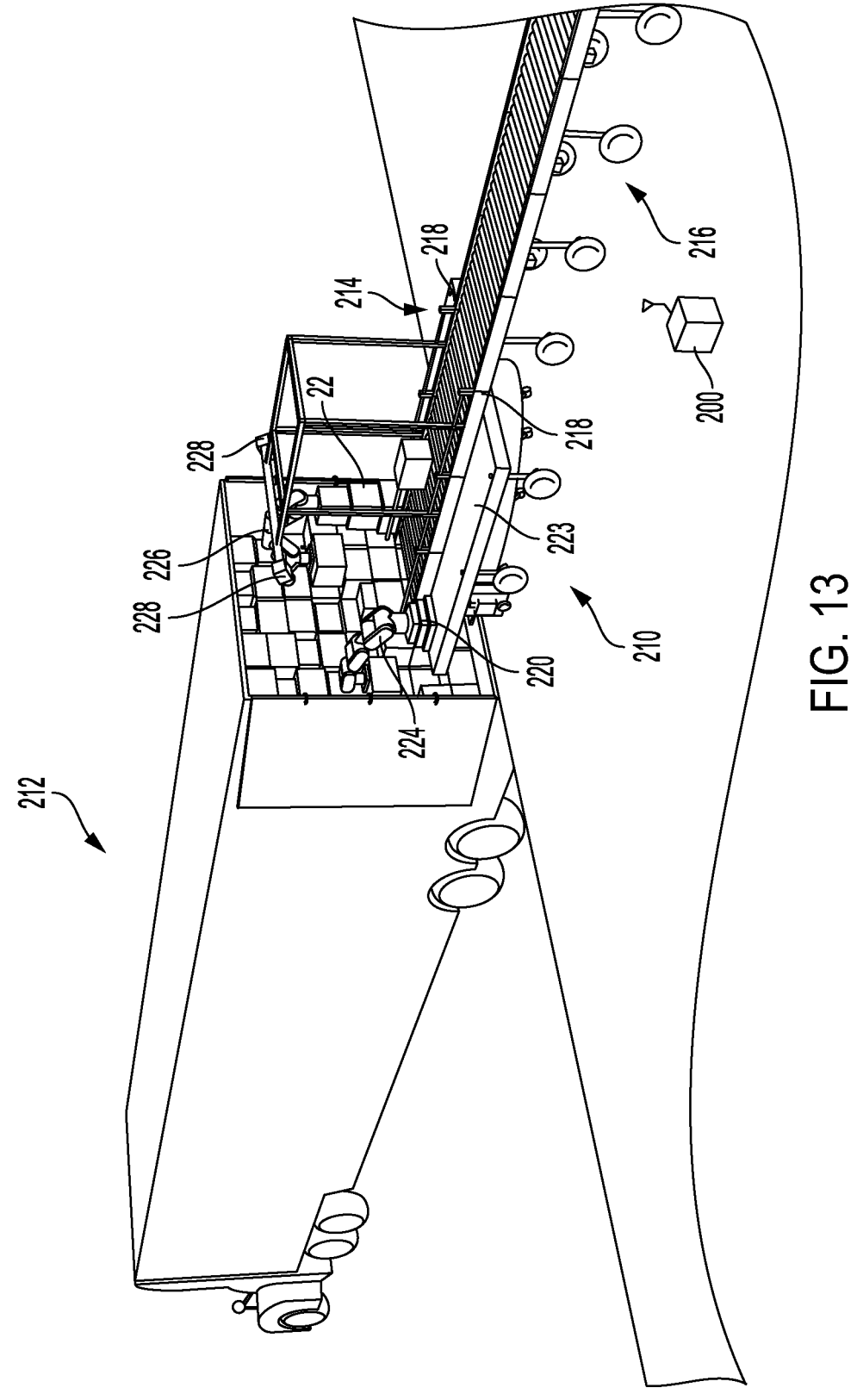
FIG. 13 shows an illustrative diagrammatic view of an object processing system in accordance with a further aspect of the present invention that includes tandem coordinated articulated arms.

In accordance with various further aspects, the dynamic engagement system 210 for engaging objects within a trailer of a tractor trailer 212 may include tandem coordinated articulated arms as shown in FIG. 13. The dynamic engagement system 210 may engage objects within a trailer 212 and include a chassis 214 that couples to a warehouse conveyor 216 via couplings 218. The chassis 214 (and the conveyor 216) are movable on wheels for permitting the engagement system 210 to enter into (and back out of) the trailer 212. The wheels on the chassis 214 are powered and the control system is remotely coupled to one or more computer processing systems 200.

Figure 14:
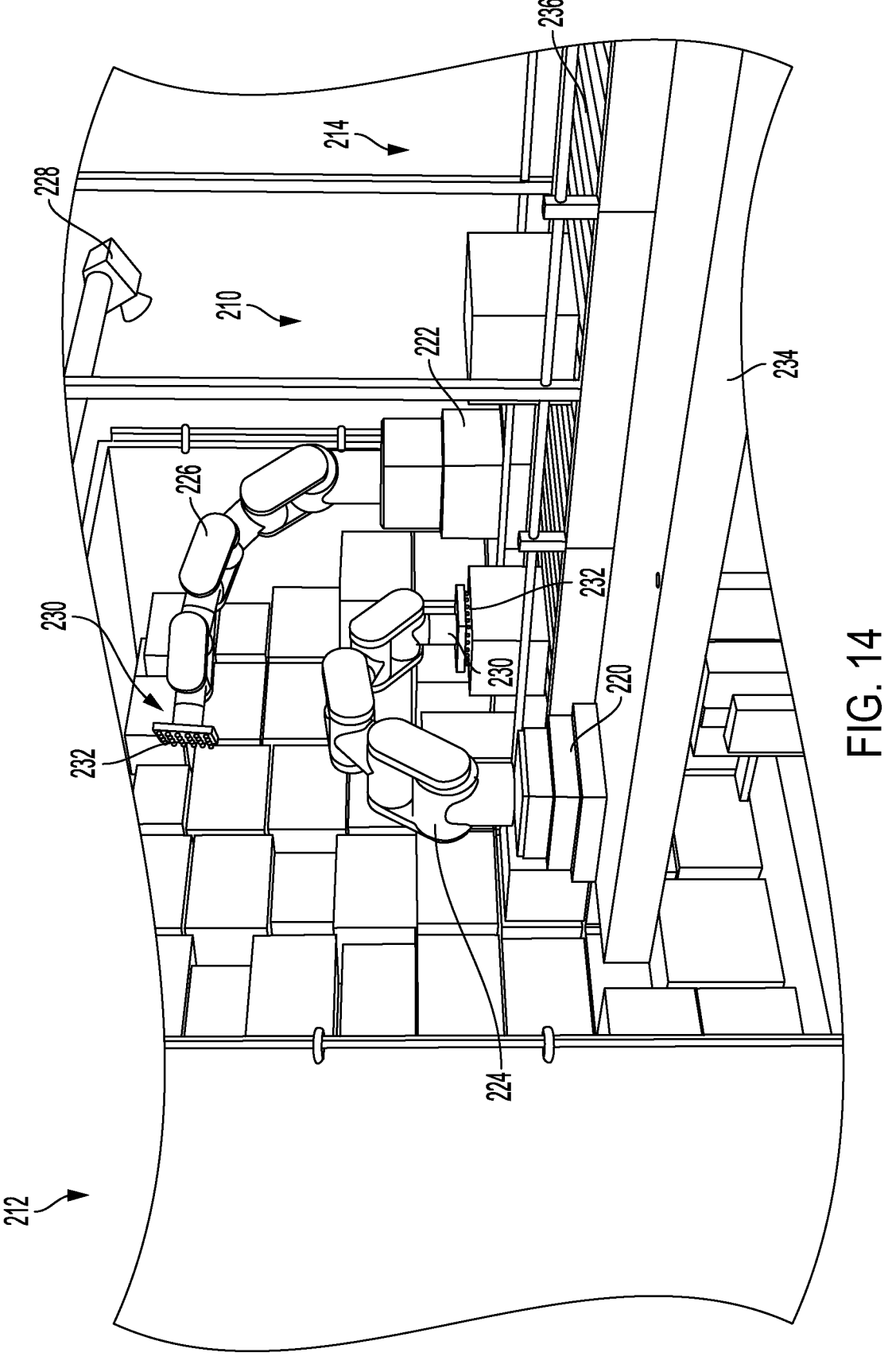
FIG. 14 shows an illustrative diagrammatic enlarged view of an object engagement portion of the system of FIG. 13.

With further reference to FIG. 14, the engagement system 210 includes two programmable motion devices 224, 226, each of which includes an end effector 230 with, for example, a plurality of vacuum cups that are coupled to a vacuum source. The programmable motion devices 224, 226 are mounted on automated adjustable height bases 220, 222 that cooperate with the programmable motion devices 224, 226 to provide further vertical ranges of motion to the end effectors 230. The bases 220, 222 are mounted on a support structure 234 that also includes a chassis conveyor 236 that couples to the warehouse conveyor 216 (shown in FIG. 13) via couplings 218. In accordance with various aspects, the programmable motion devices 224, 226 are cooperatively operable to efficiently unload objects from the trailer 212 as discussed in more detail below.

Figure 15:
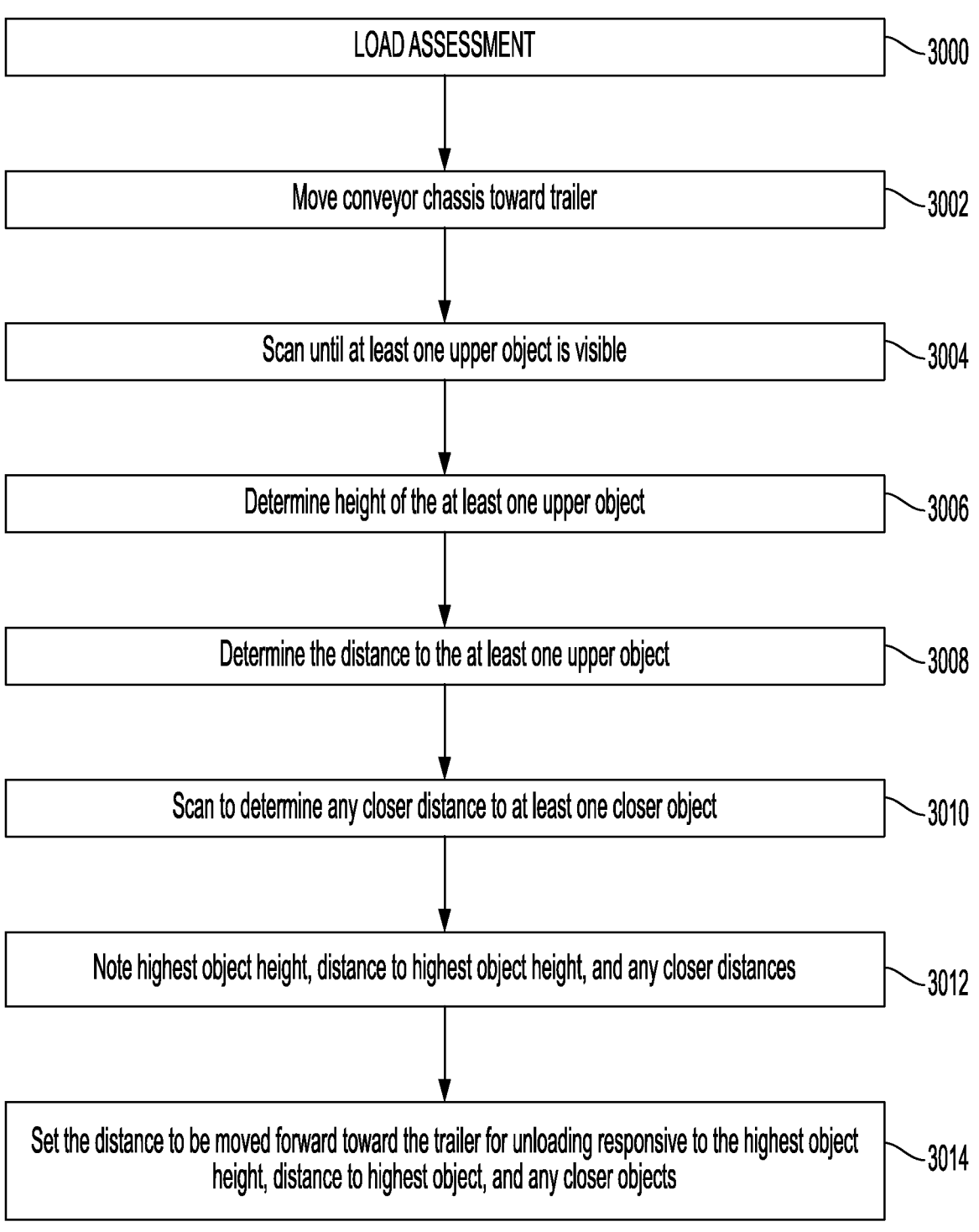
FIG. 15 shows an illustrative diagrammatic flow diagram of a load assessment system in accordance with a further aspect of the present invention.

Initially, the load of objects within a trailer may be assessed. With reference to FIG. 15, a load assessment routine may begin (step 3000) by moving the conveyor chassis toward the trailer (step 3002). The system may then scan until at least one upper object is visible (step 3004). Distance and position detection sensors in the perception units 228 are then used to determine a height of the at least one upper object (step 3006) as well as a distance to the at least one upper object (step 3008). The panel is then further lowered to determine whether (and if so where) any lower objects are provided in the trailer that are closer in distance to the dynamic engagement system than the at least one upper object (step 3008). The highest object height, distance to the highest object, and distances to any closer objects are noted (step 3012), and the system then sets the distance to be moved forward toward the trailer for unloading responsive to the highest object height, distance to the highest object, and distances to any closer objects (step 3014). In particular, the chassis is positioned near the nearest objects.

Once the chassis is positioned, each facing object is assessed. In particular for example and with reference to FIG. 16, an object assessment routine may begin (step 4000) by evaluating object boundaries. For each object encountered top down and across, all boundaries of a front face of each object of interest are identified (step 4002). For each object of interest, the system will also determine any boundaries of a top face associated with the front face (step 4004). With this information, the system may determine whether the top face includes a surface suitable for vacuum cup grasping, and provide top grasp assessment data (step 4006). The system may also determine whether the front face includes a surface suitable for vacuum cup grasping, and provide front gasp assessment data (step 4008). The system may also determine whether any exposed side face includes a surface suitable for vacuum cup grasping, and provide side grasp assessment data (step 4010). The system may then provide dynamic object engagement instructions responsive to the top grasp assessment data, the front grasp assessment data, and the side grasp assessment data (step 4012). The processing is performed by one or more computer processing systems 200 in communication (either directly or wirelessly) with the programmable motion devices, perception units, conveyor systems and pallet removal systems discussed herein.

In accordance with various aspects, the programmable motion devices 224, 226 are cooperatively operable to provide dynamic engagement of the objects in the trailer. The cooperative operability, for example, may minimize any time that one programmable motion device must wait for the other programmable motion device. This may be achieved by recognizing that the processing of objects that are closer to the upper elevations within the trailer may require more time (to be grasped, moved and placed onto the conveyor 236) than do objects that are not near the upper elevations within the trailer. The programmable motion devices 224, 26 may both process objects at comparable lower elevations at the same time, while the programmable motion devices 224, 226 may both process objects at comparable upper elevations at the same time. In this way, the devices 224, 226 may most efficiently alternate grasping objects within the trailer and placing them onto the chassis conveyor 236. With both devices grasping objects at the same elevation, the travel time from grasping an object to placement on the conveyor 36 is closely matched as between the devices 224, 226.

In accordance with further aspects, the cooperative operability may involve one programmable motion device grasping an object, and moving the object toward a commonly reachable (by both devices 224, 226) location. The other (second) programmable motion device may then grasp the object, the first programmable motion device then releases the object, and the second programmable motion device then moves the object to the conveyor 236 on which it is placed. One programmable motion device (e.g., 226) may grasp an object. The programmable motion device may then move the object to a commonly reachable location. A commonly reachable location may be a location at which both programmable motion devices may be able to reach the object at the same time. The other programmable motion device 224 may then also grasp the object, and the first programmable motion device 226 may then release the object. The programmable motion device 224 may then move the object 238 to the conveyor 236, and place the object onto the conveyor 326. With both devices working together in this way, the time to unload objects from the trailer may be improved in certain applications, for example, where the programmable motion devices must reach further distances to grasp objects, or where objects are required to be placed slowly onto the conveyor 236.

In accordance with further aspects, the cooperative operability may involve the two programmable motion devices working together to lift a heavy object. The cooperative operability may involve one programmable motion device grasping an object 240, and moving (e.g., sliding) the object to a commonly reachable (by both devices 224, 226) location. The other (second) programmable motion device may then also grasp the object, and the first and second programmable motion devices may then together lift the object to the conveyor 236 on which it is placed. One programmable motion device (e.g., 224) may grasp an object. If the object is determined to be heavy (either by having the device 224 try to lift the object, or by accessing a database with a known identity of the object) the programmable motion device may then slide the object toward a commonly reachable location at which both programmable motion devices 224, 226 may be able to grasp the object at the same time. The other programmable motion device (e.g., 226) may then also grasp the object. The grasp position of the first programmable motion device 224 may also be adjusted, and the object 240 may be further moved with the new grasp position. The two programmable motion devices may then cooperate to lift the object onto the conveyor 236. With both devices working together in this way, the system may be able to handle the processing of heavier objects, may increase speed of handling heavier objects, and may increase system life by reducing loads on individual programmable motion devices. Movement of the dynamic engagement system is provided through the one or more processing systems 200 in communication with the perception system 228, the articulated arms 224 226, the automated adjustable bases 220, 222, and the conveyor wheels actuators.

Figures 17, 18:
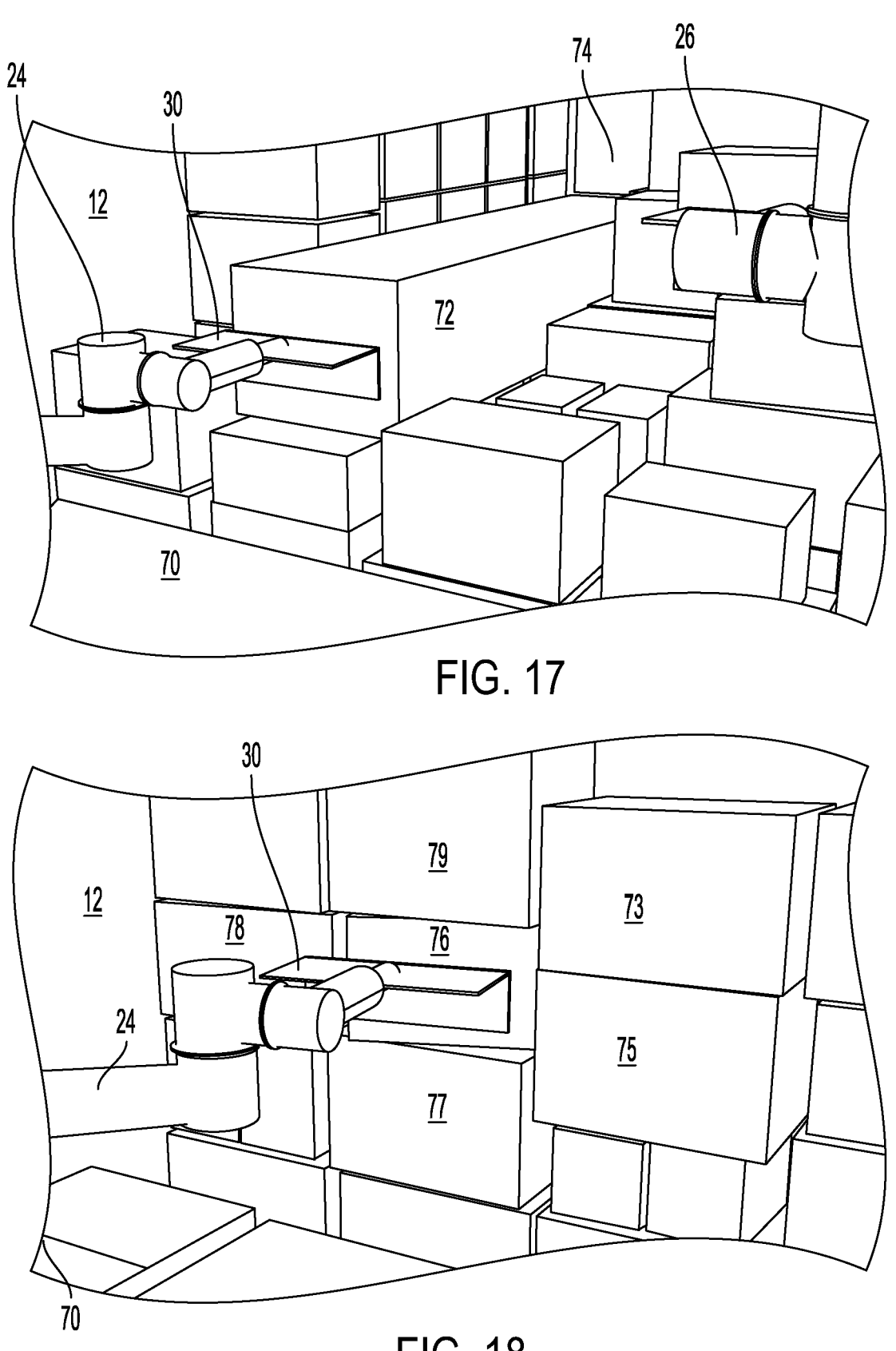
FIG. 17 shows an illustrative diagrammatic view of an object processing system in accordance with an aspect of the present invention engaging a particularly long object.
FIG. 18 shows an illustrative diagrammatic view of an object processing system in accordance with an aspect of the present invention engaging an object that is blocked from movement.

In various applications, obstructions may be encountered, and these obstructions may be addressed in any of a variety of ways using modelling and machine learning. For example, a particularly large object may be encountered (e.g., that is very long) as shown in FIG. 17. The long object 72 may be encountered when only an exposed side is visible or it may be apparent when the object is encountered that it will be long (e.g., an exposed end of a kayak). If the system is unable to move an object, it will move on to the task of moving other objects (as discussed a above) until the object is sufficiently free. Additionally, there may be further objects (e.g., 74) on top of the object 72 that are not yet reachable by the articulated arms 24, 26. In further applications, obstructions may be encountered where the object is too heavy to be moved or cannot be freed from surrounding objects. FIG. 18 shows an object 76 that is blocked from being moved by the end-effector 30 by surrounding objects 73, 75, 77, 78, 79.

In either of these situations, the system may apply a maximum normal run-time vacuum pressure, and if this fails, the system may set a signal indicating the need for human personnel intervention. Alternatively, the system may conduct some analyses and develop a removal model. The system may characterize the end-effector movements in terms of the forces and torques it can apply to the load, and then look at the ensemble of objects, the wall, and all the places the effector could be placed, and the forces and torques that could be applied. The system may estimate what any resulting motion would occur. Sometimes an object may move, e.g., lift up, slide out of the wall, or slide onto the platform. Sometimes the object may pivot to a more accessible pose. Sometimes, however, the object may pivot to be cocked and harder to remove, which information should be provided by the model (to be avoided). Sometimes multiple objects move, which is generally ok. Simulation modules characterize the possible outcomes of feasible end-effector actions. Machine learning may further be used to learn a mapping from loads to provide good end-effector behaviors, given the wide variability of events such as the object doesn't move, the object is heavier than anticipated, or the friction is more significant than anticipated, or neighboring objects move in unwanted ways. That modelled outcome could be observed and integrated in the modeling system so that removal models may be developed accordingly.

Figure 19:
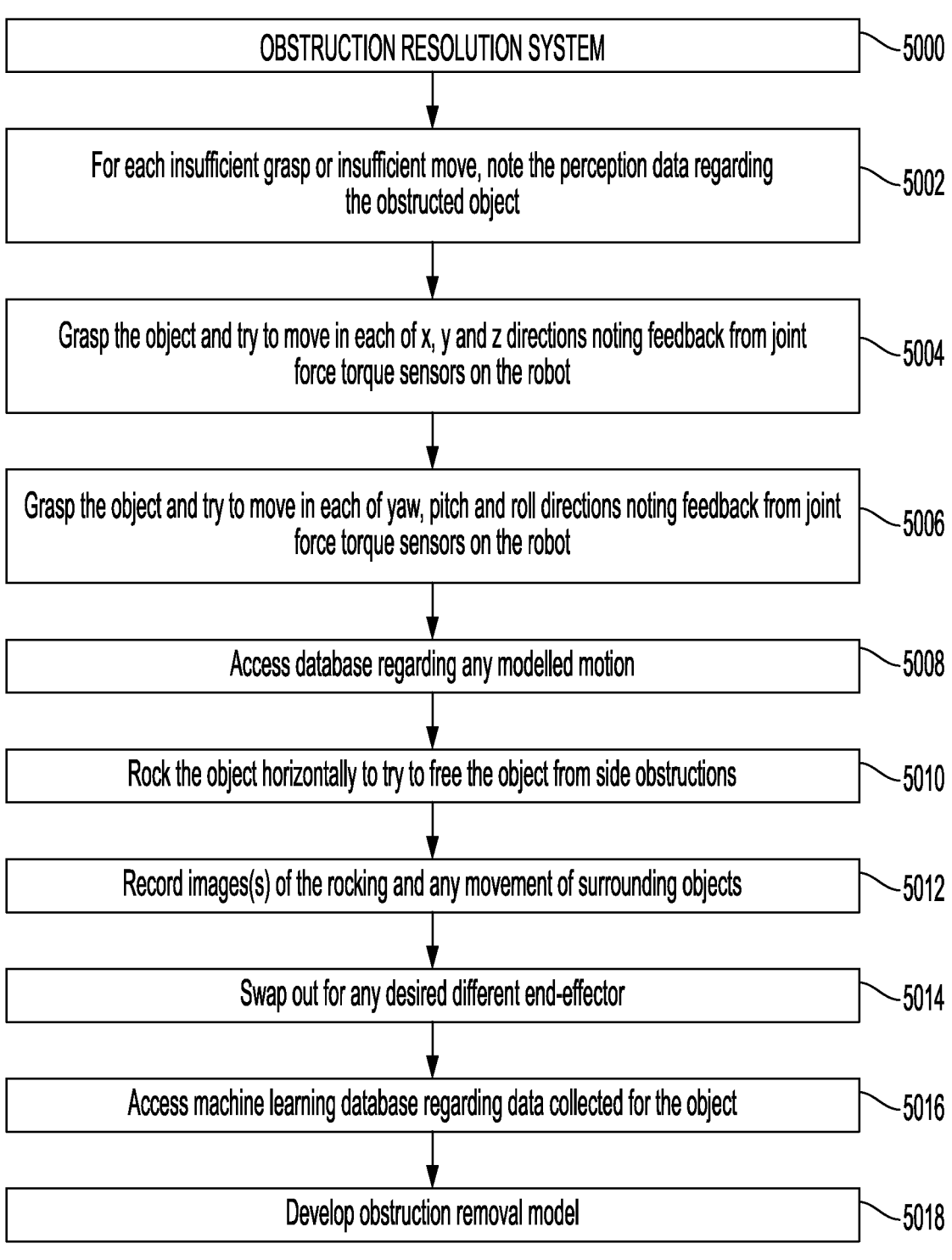
FIG. 19 shows an illustrative diagrammatic functional flow diagram of an obstruction resolution routine in a system in accordance with an aspect of the present invention.
Figures 27, 28:
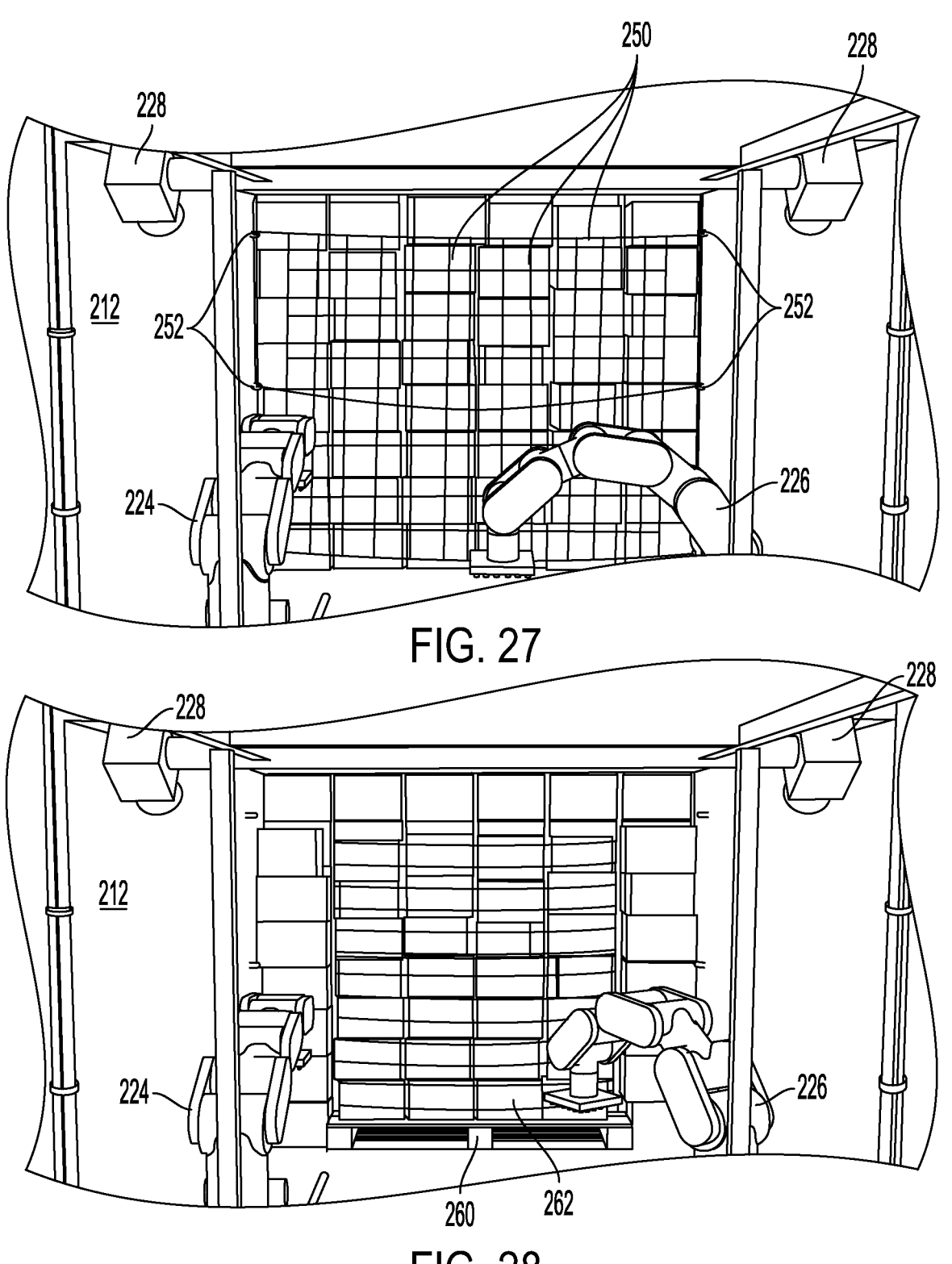
FIG. 27 shows an illustrative diagrammatic end view of an object processing system in accordance with an aspect of the present invention encountering a netting within a trailer including tandem coordinated arms.
FIG. 28 shows an illustrative diagrammatic end view of an object processing system in accordance with an aspect of the present invention encountering a loaded wrapped pallet within a trailer including tandem coordinated arms.

For example, FIG. 19 shows the functional process of an obstruction resolution routine that may begin (step 5000) by noting for each insufficient grasp or insufficient move, the perception data regarding the obstructed object (step 5002). The system may then grasp the object and try to move in it each of x, y and z directions noting feedback from joint force torque sensors on the robot (step 5004). The system may then try to move the object in each of yaw, pitch and roll directions noting feedback from joint force torque sensors on the robot (step 5006). This sensor feedback information may provide significant data that facilitates not only identifying an efficient removal model, but may help classify objects for facilitating handling unknown objects. The system may then access the database regarding any modelled motion (step 5008), and if no removal model is found, the system may rock the object horizontally to try to free the object from side obstructions (step 5010). Such rocking may sufficiently loosen the object for removal. The system may then record image(s) of the rocking and any movement of surrounding objects (step 5012). If it is determined that a different end-effector should be used, the system may swap out the end-effector for any desired different end-effector (step 5014) as also shown in FIGS. 27 and 28. The system may then access machine learning database regarding data collected for the object (step 5016) and the develop obstruction removal model (step 5018).

Figures 20, 21:
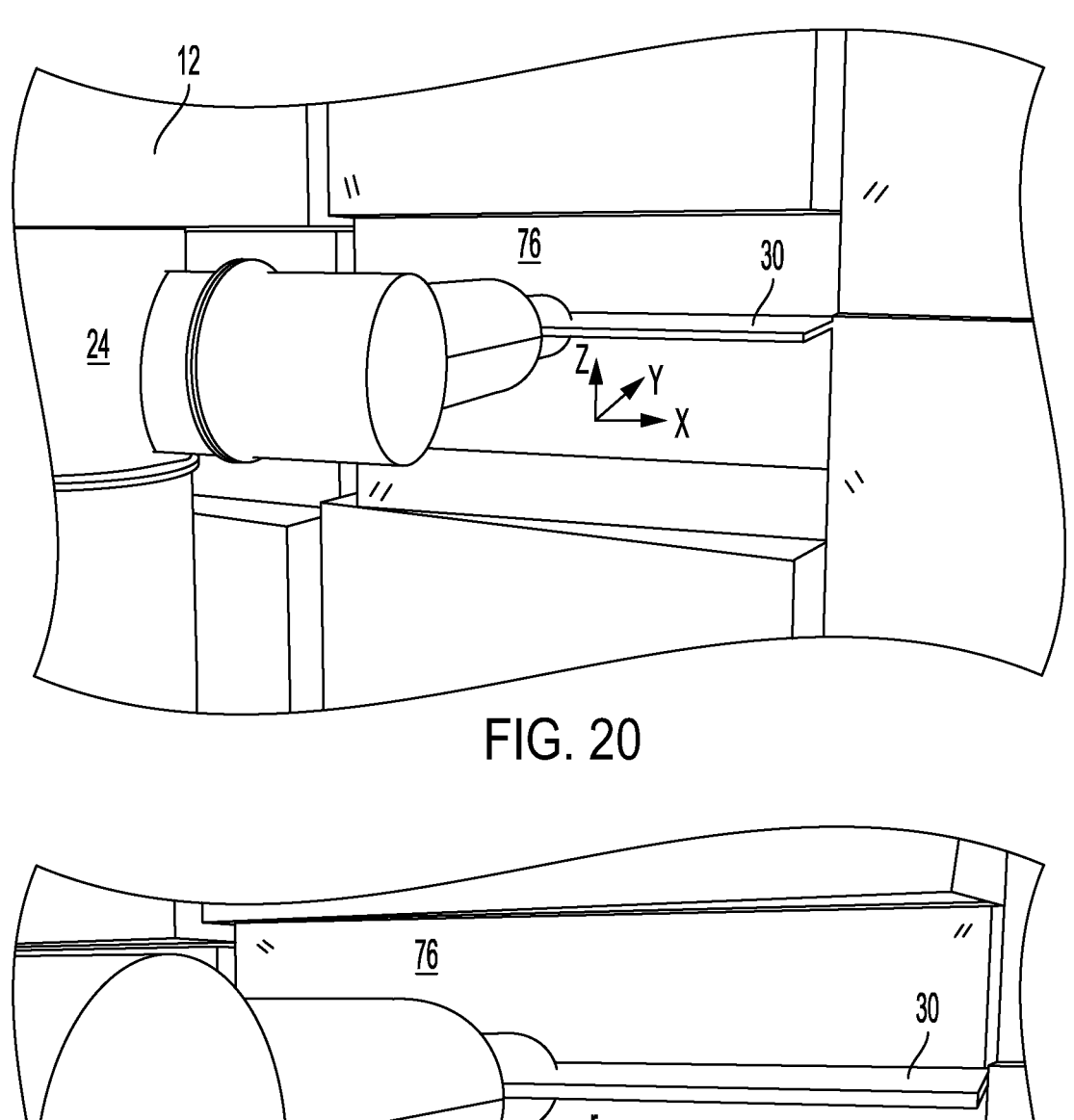
FIG. 20 shows an illustrative diagrammatic view of an obstructed object being subjected to applied forces in each of three mutually orthogonal directions.
FIG. 21 shows an illustrative diagrammatic view of the obstructed object of FIG. 20 being subjected to forces in each of yaw, pitch and roll rotational directions.

With reference to FIG. 20, for example, the end-effector 30 may try to move an obstructed object 76 in each of x, y, and z directions, noting the feedback on joint force torque sensors on the articulated arm. With reference to FIG. 21, the end-effector 30 may further try to move the obstructed object 76 in each of yaw, pitch and roll directions, again noting the feedback on joint force torque sensors on the articulated arm. This non-visually observable feedback information may provide valuable insights for the machine learning system in developing efficient removal models.

Figure 22:
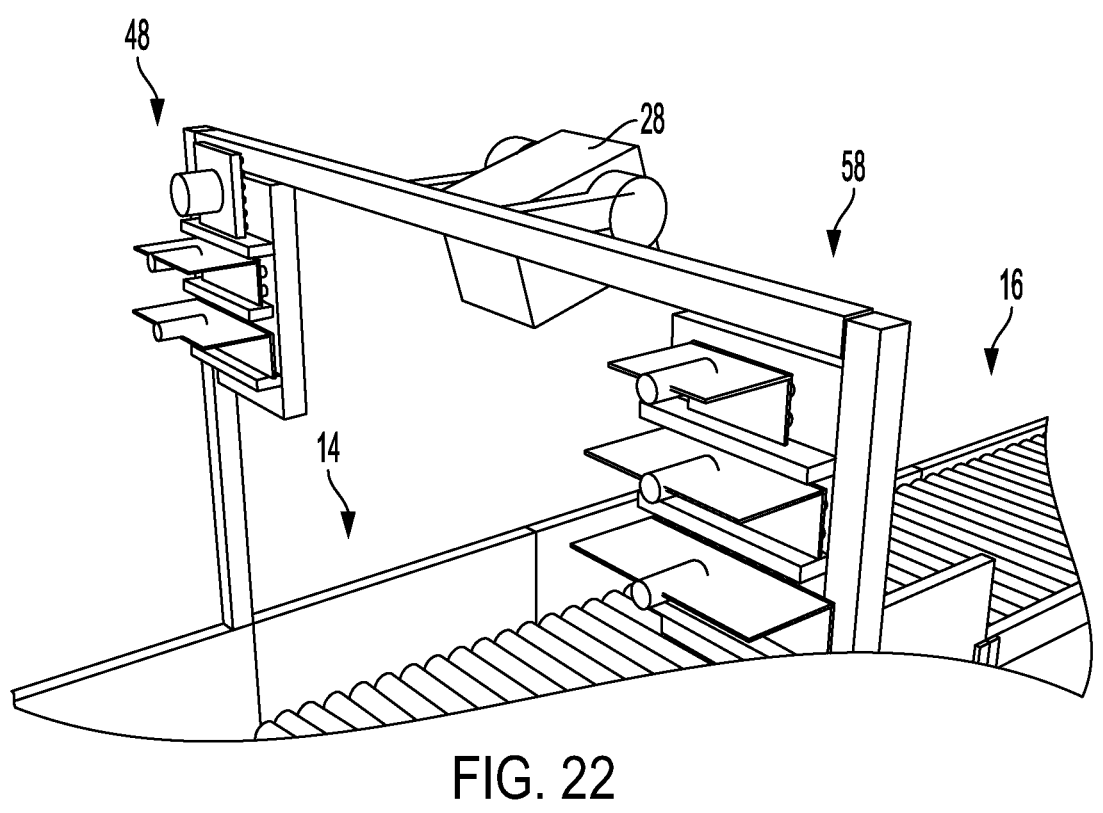
FIG. 22 shows an illustrative diagrammatic view of an object processing system in accordance with an aspect of the present invention that includes a plurality of substitutable end-effector tools for use with the object processing system.
Figure 23:
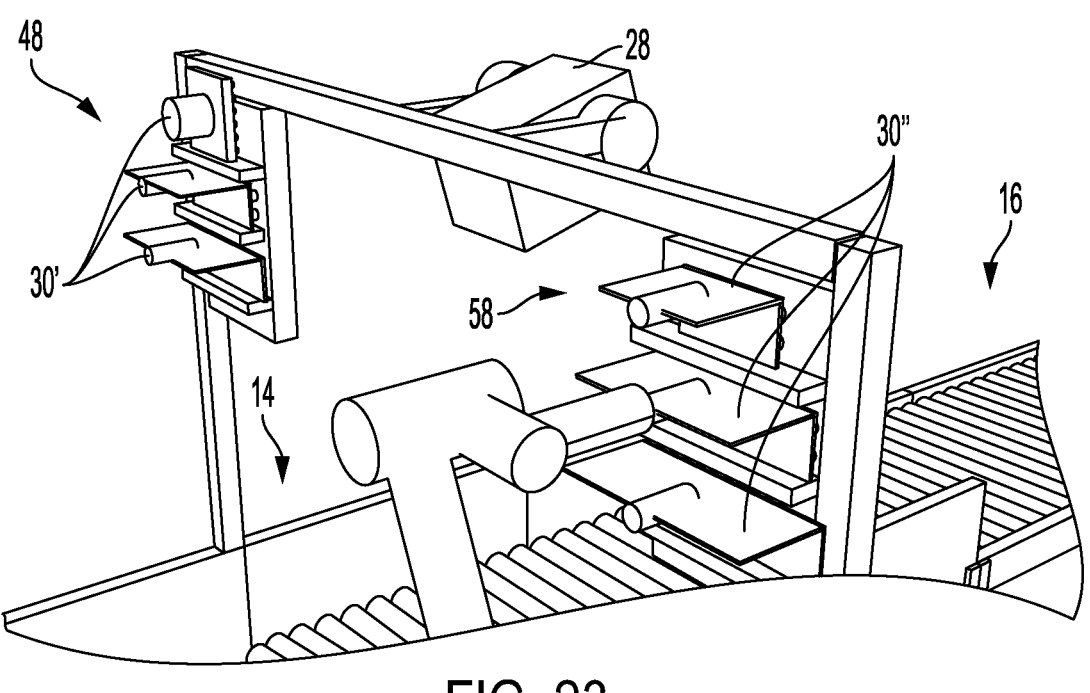
FIG. 23 shows an illustrative diagrammatic view of the object processing system of FIG. 22 with and plurality of substitutable end-effector tools with one end-effector tool being accessed by a programmable motion device.

FIG. 22 shows an object processing system in accordance with an aspect of the present invention as discussed above that includes a pair of end-effector swap racks 48, 58 on which a plurality of further end-effectors 30', 30" may be provided for use by the articulated arms 24, 26. As shown in FIG. 23, each articulated arm (e.g., 24 as shown) may access each further end-effector for automatically swapping out the end-effector as the removal model may require.

Figure 24:
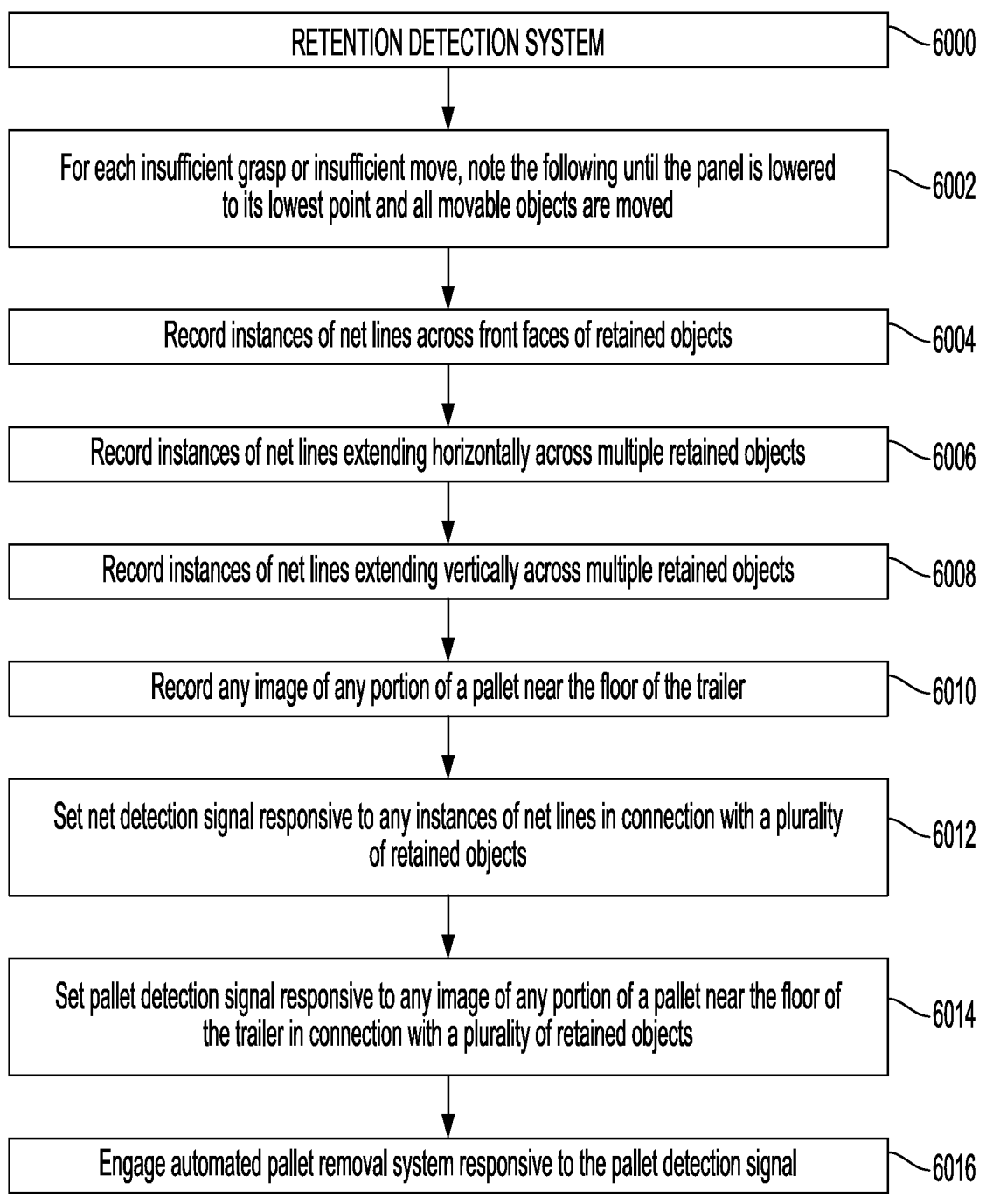
FIG. 24 shows an illustrative diagrammatic elevated view of a retention detection system in an object processing system in accordance with an aspect of the present invention.

A retention detection system may also be employed to determine whether a retention system is present within a trailer (e.g., such as a restraining net, wall, or set of objects that are wrapped together, for example and provided on a pallet). With reference to FIG. 24, the retention detection system begins (step 6000) by being triggered for each object that may not be sufficiently processed. In particular, for each insufficient grasp of an object or insufficient attempted move of an object, the following data is collected (step 6002). This is done until the panel is lowered to its lowest point and all movable objects are moved. The system then records instances of net lines across front faces of retained objects (step 6004), and then record instances of net lines extending horizontally across multiple retained objects (step 6006). The system then records instances of net lines extending vertically across multiple retained objects (step 6008), and then records any image of any portion of a pallet near the floor of the trailer (step 6010). The system then sets a net detection signal responsive to any instances of net lines in connection with a plurality of retained objects (step 6012), and then sets a pallet detection signal responsive to any image of any portion of a pallet near the floor of the trailer in connection with a plurality of retained objects (step 6014). The system then engages the automated pallet removal system responsive to the pallet detection signal (step 6016).

The programmable motion devices 24, 26, 224, 226 each include force torque sensors at each of the their respective joints, and the output information from the force torque sensors is provided to the one or more computer processing systems 100, 200.

Figures 25, 26:
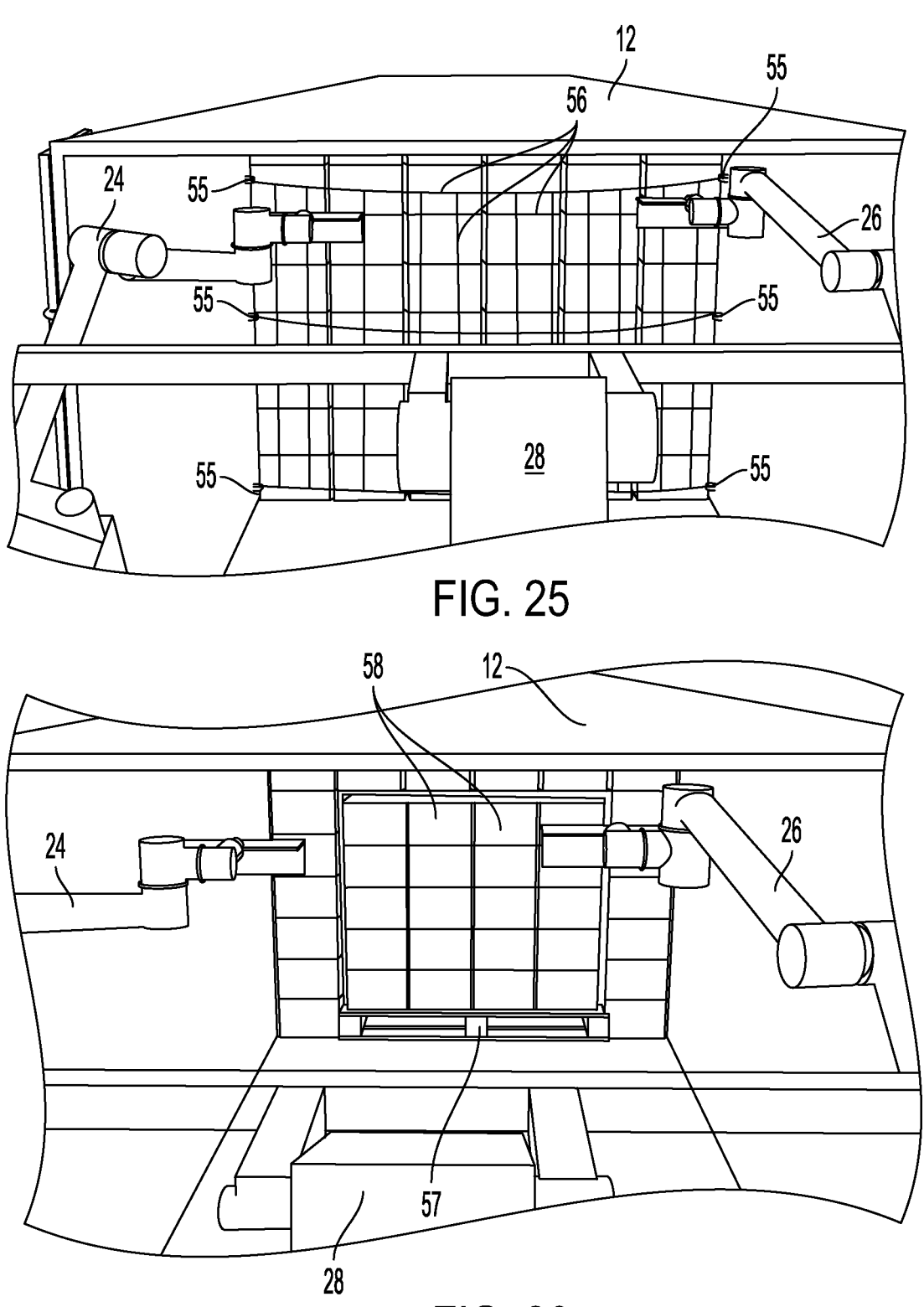
FIG. 25 shows an illustrative diagrammatic end view of an object processing system in accordance with an aspect of the present invention encountering a netting within a trailer.
FIG. 26 shows an illustrative diagrammatic end view of an object processing system in accordance with an aspect of the present invention encountering a loaded wrapped pallet within a trailer.

During the removal of objects therefore, if any object may not be removed (either may not be able to be grasped properly, or may not be movable due to an obstruction), the system will run a retaining detection routine to determine whether any of the objects are retained within the trailer. The system will continue, moving to a next object until all objects that may be moved are moved onto the panel 20. Each time an object is identified as being not movable (again either not graspable or is blocked), the system will run the retaining detection routine. The retaining detection routine may be run on the one or more computer processing systems 100 with perception data from the perception unit 28, and may analyze image data in combination with object grasp attempt data to identify whether any retention system is inhibiting the removal of objects from the trailer. If a retaining feature is present, the system will run for each object that is found to be not movable. A combination of the results of the multiple executions of the routine provides duplicative results that should confirm the type of retaining feature present. For example, FIG. 25 shows a netting 56 that spans the width and height of the trailer and are attached to mounts 55. Such netting 56 may be installed manually upon loading of the trailer, and may be required to be removed manually with unpacking the trailer. An alarm (light and/or sound) will be triggered if a netting is detected by the system, and removed by human personnel.

Alternatively, as the movable objects are removed, an image of an exposed end of a pallet at the floor of the trailer may be detected. The objects on the pallet may be wrapped (accounting for the system being unable to move individual objects), and upon detection of the pallet, the system will trigger a pallet removal command. FIG. 26 for example, shows a pallet 57 on which objects are provided within a wrapping (e.g., clear plastic) 58. Objects within the wrapping 58 on the pallet will not be movable by the end effector 30, and the system will run the retaining detection routine. Once the bottom of the trailer becomes clear, the pallet 57 will become visible to the perception system 28, and the system will register that a pallet is present. Again, an alarm (light and/or sound) will be triggered if a pallet is detected by the system, and the pallet and its associated objects may be removed by human personnel.

During the removal of objects therefore, if any object may not be removed (either may not be able to be grasped properly or may not be movable due to an obstruction), the system will run the retaining detection routine to determine whether any of the objects are retained within the trailer. The system will continue moving to a next object until all objects that may be moved are moved. Each time an object is identified as being not movable (again either not graspable or is blocked), the system will run the retaining detection routine. The retaining detection routine may be run on the one or more computer processing systems 200 with perception data from the perception units 228, and may analyze image data in combination with object grasp attempt data to identify whether any retention system is inhibiting the removal of objects from the trailer. If a retaining feature is present, the system will run for each object that is found to be not movable.

A combination of the results of the multiple executions of the routine provides duplicative results that should confirm the type of retaining feature present. For example, FIG. 27 shows a netting 250 fastened to an attachment mount that spans the width and height of the trailer. Such netting may be installed manually upon loading of the trailer, and may be required to be removed manually with unpacking the trailer. An alarm (light and/or sound) will be triggered if a netting is detected by the system, and removed by human personnel.

Alternatively, as the movable objects are removed, an image of an exposed end of a pallet at the floor of the trailer may be detected. The objects on the pallet may be wrapped (accounting for the system being unable to move individual objects), and upon detection of the pallet, the system will trigger a pallet removal command. FIG. 28 for example, shows a pallet 260 on which objects are provided within a wrapping (e.g., clear plastic) 262. Objects within the wrapping 262 on the pallet will not be movable by the end effector 230, and the system will run the retaining detection routine. Once the bottom of the trailer becomes clear, the pallet 260 will become visible to the perception system 228, and the system will register that a pallet is present. Again, an alarm (light and/or sound) will be triggered if a pallet is detected by the system, and the pallet and its associated objects may be removed by human personnel.

Figure 29:
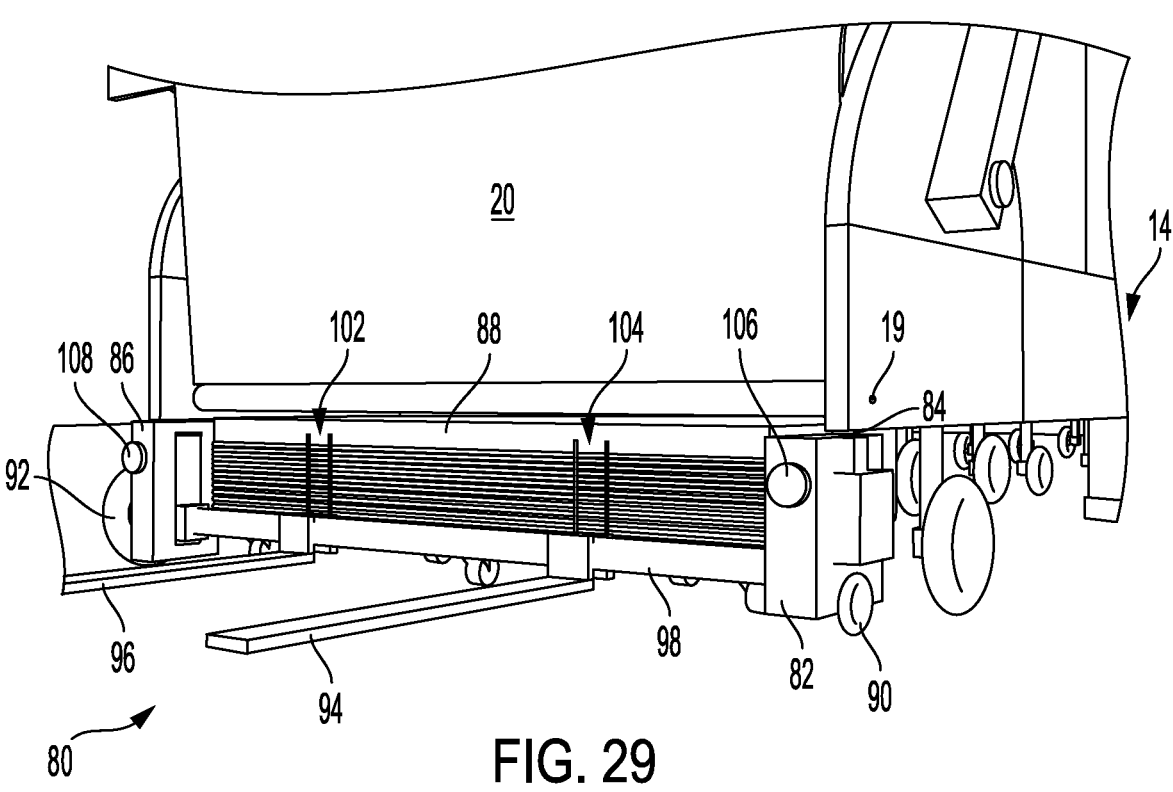
FIG. 29 shows an illustrative diagrammatic enlarged front view of a pallet removal system in accordance with an aspect of the present invention with the pallet forks in a lowered position.
Figure 30:
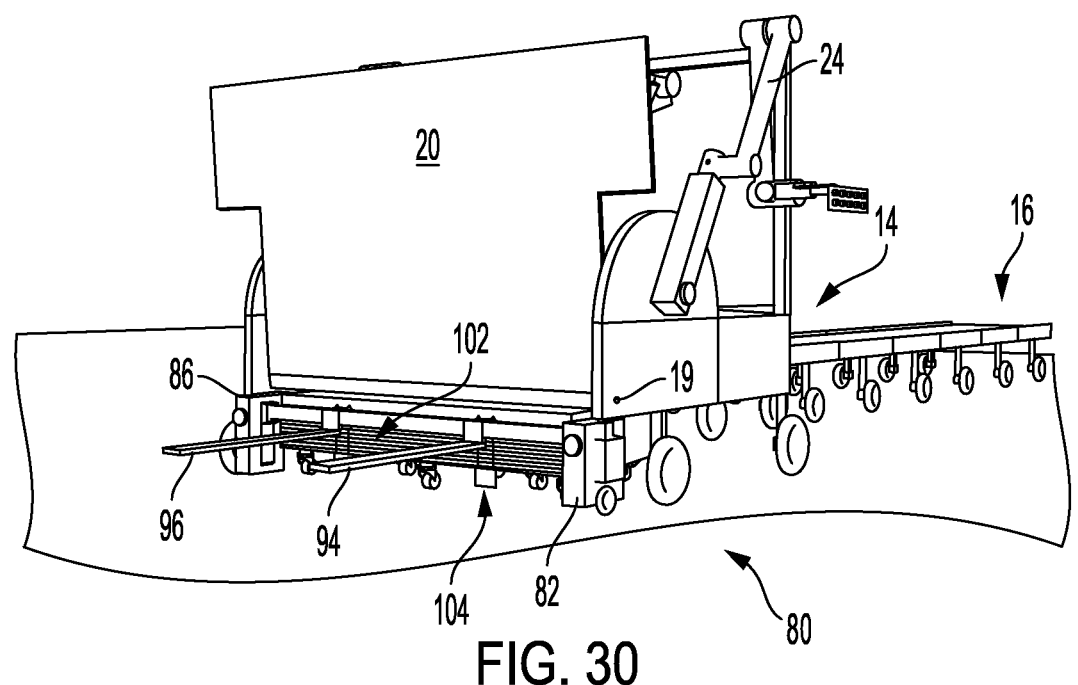
FIG. 30 shows an illustrative diagrammatic enlarged front view of a pallet removal system in accordance with an aspect of the present invention with the pallet forks in a raised position.

In accordance with further aspects, when the system detects the presence of a pallet as above, the system may employ an automated pallet removal system. In particular and with reference to FIG. 29, the system may include a pallet removal system 80 that includes a fixed pivot end 82 that rotates with respect to the chassis conveyor 14 by a pivot pin 84, and a rotating swing end 86, both of which ends 82, 86 being coupled to a swing bar 88. The swing bar 88 is attached to a counterweight portion 110 that is supported by a plurality of heavy-duty casters 112. The pallet removal system 80 also includes a pair of forks 94, 96 that are mounted to a cross bar 98, and the cross bar 98 may be actively raised or lowered along tracks 102, 104 as controlled by the one or more computer processing systems. FIG. 30 shows the forks 94, 96 and the cross bar 98 in the raised position. The pallet removal system 80 may also include one or more perception systems at the cross bar 98 to aid the pallet removal process (the perception system 28 may be blocked by the panel 20).

Figure 31:
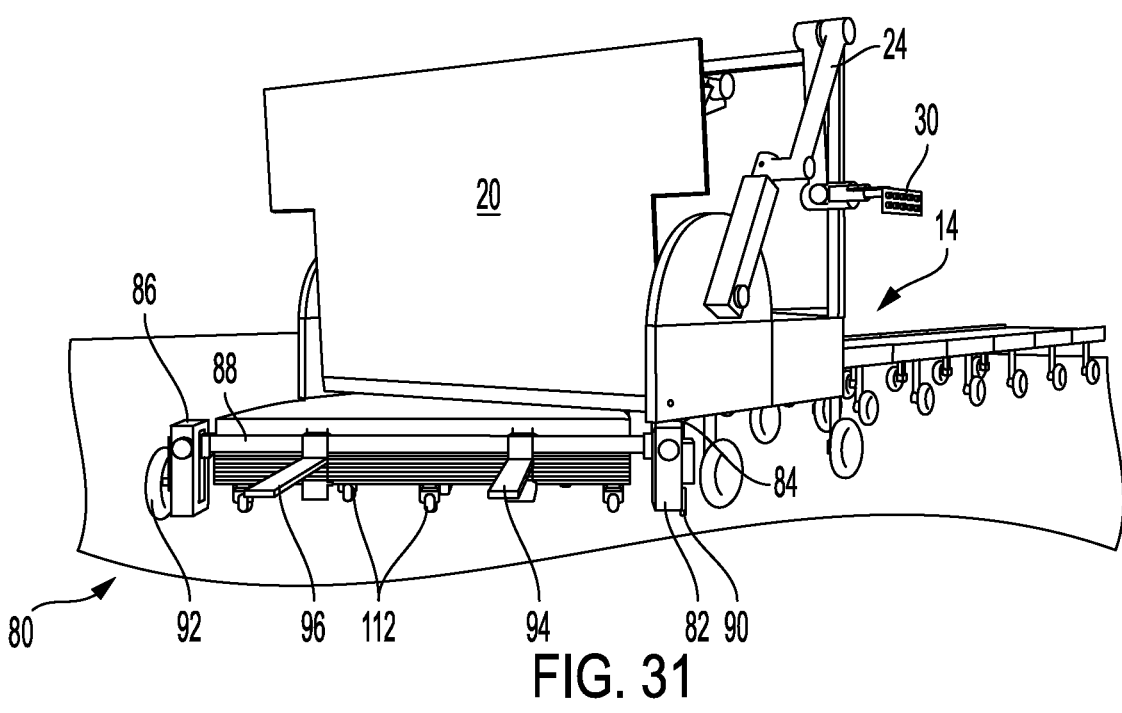
FIG. 31 shows an illustrative diagrammatic enlarged front view of the pallet removal system of FIG. 29 with the pallet removal system in a partially rotated position.
Figure 32:
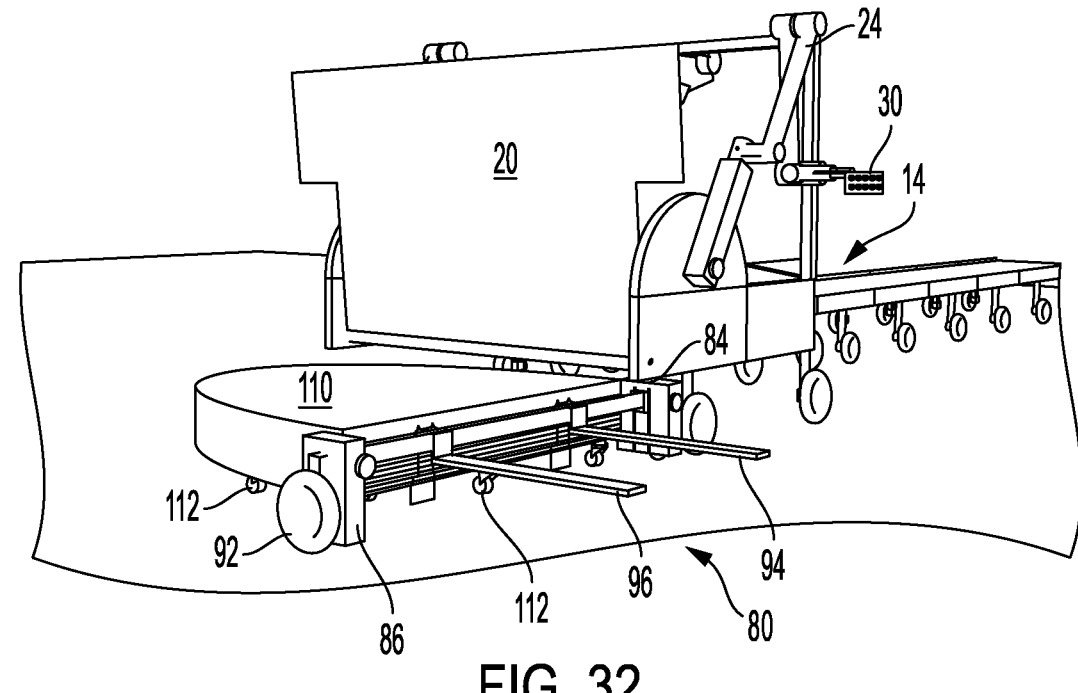
FIG. 32 shows an illustrative diagrammatic enlarged front view of the pallet removal system of FIG. 29 with the pallet removal system in a fully rotated position.
Figure 33:
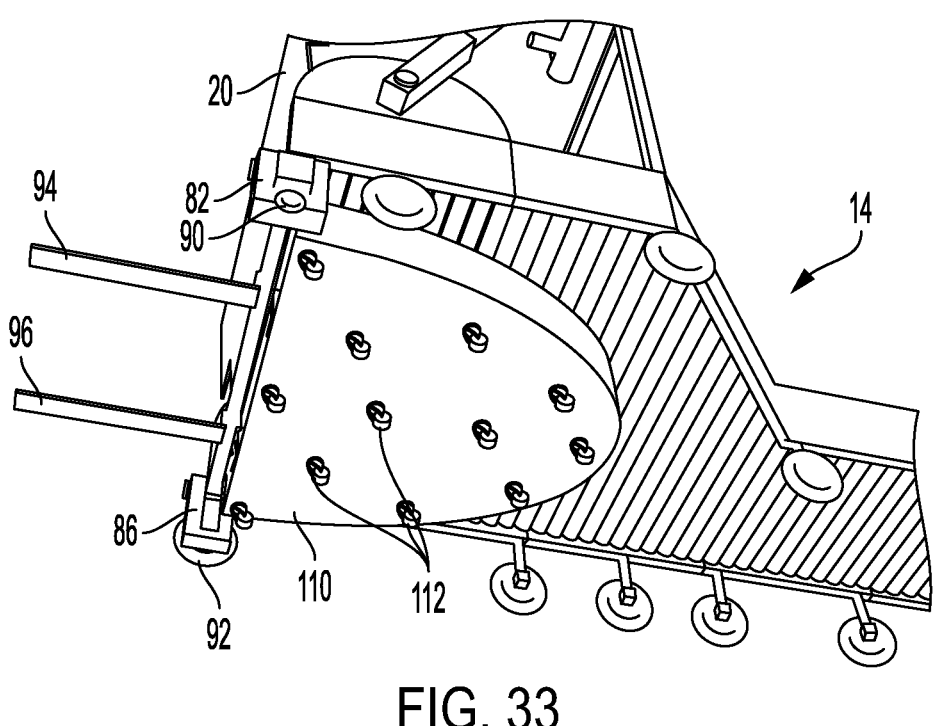
FIG. 33 shows an illustrative diagrammatic underside view of the pallet removal system of FIG. 29 with the pallet removal system in a nonrotated position.
Figure 34:
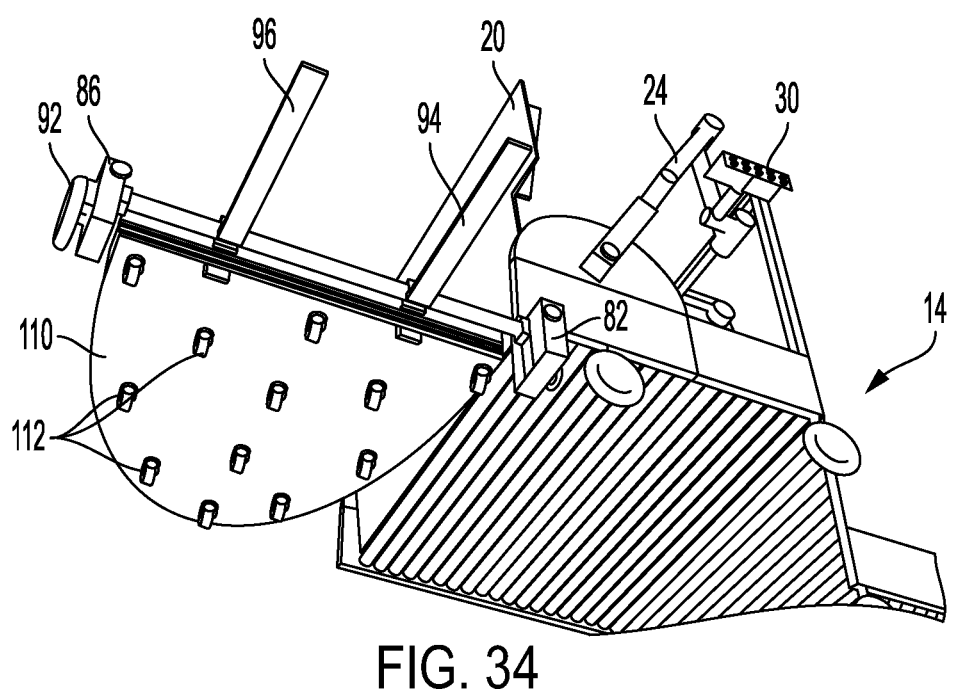
FIG. 34 shows an illustrative diagrammatic underside view of the pallet removal system of FIG. 32 with the pallet removal system in a fully rotated position.
Figure 35:
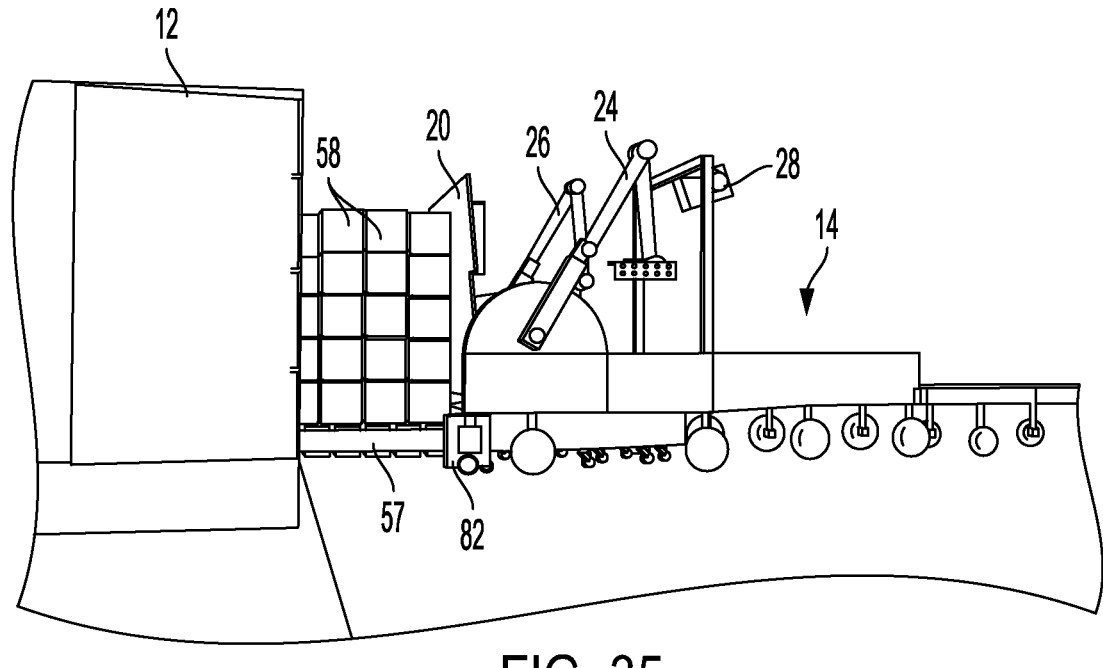
FIG. 35 show an illustrative diagrammatic side view of an object processing system in accordance with an aspect of the present invention in which a wrapped pallet is being removed from the trailer.
Figure 36:
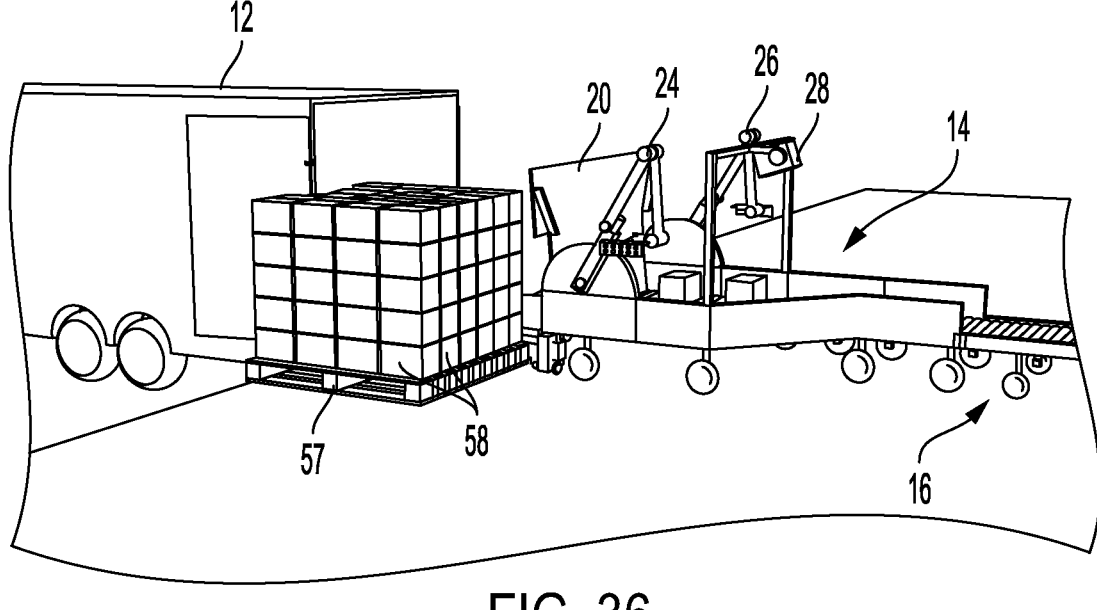
FIG. 36 shows an illustrative diagrammatic view of the object processing system of FIG. 35 wherein the wrapped pallet is being lowered onto a shipping and receiving dock.
Figures 37, 38:
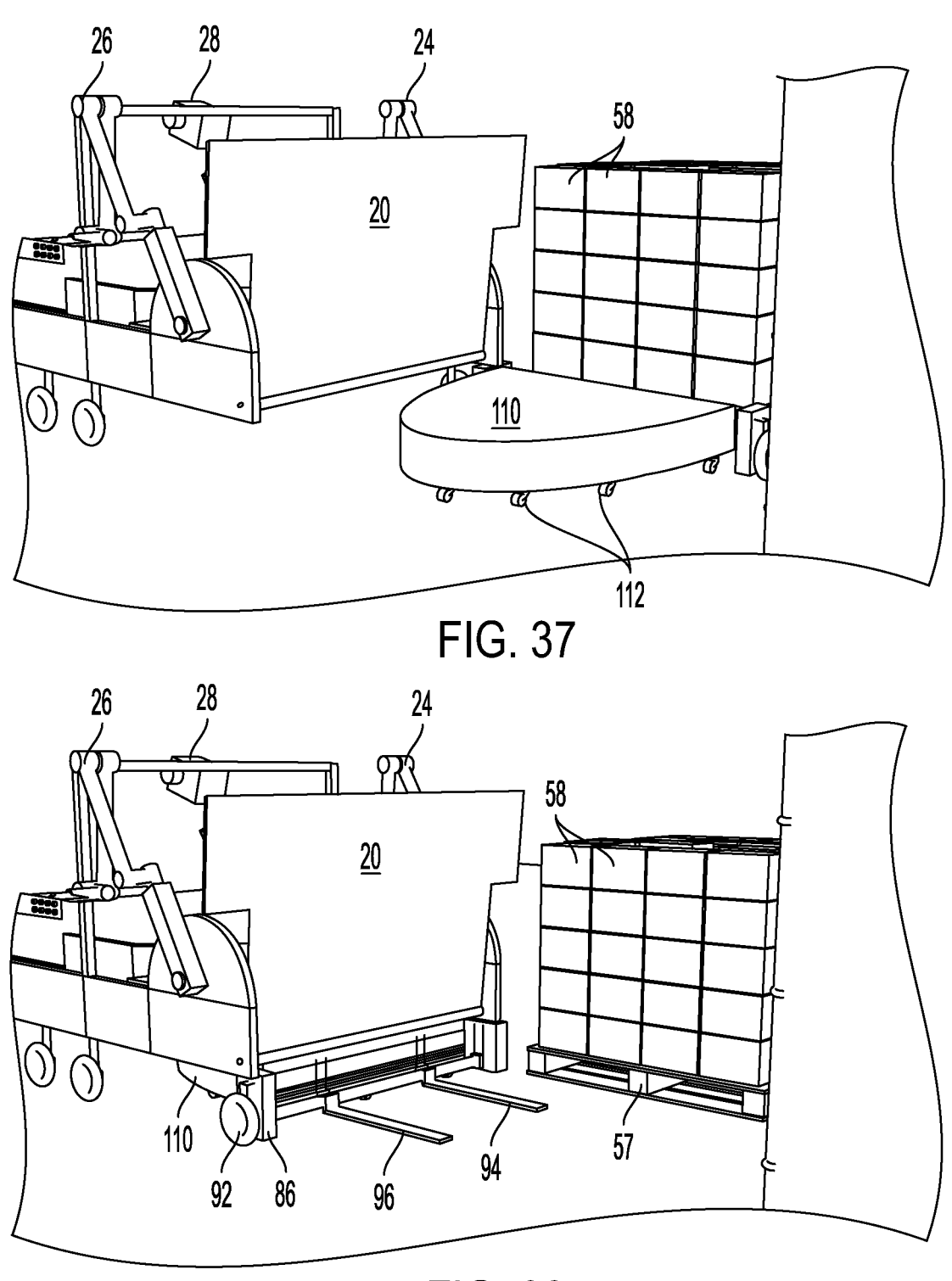
FIG. 37 shows an illustrative diagrammatic view of the object processing system of FIG. 36 with the pallet removal system in a lowered position.
FIG. 38 shows an illustrative diagrammatic view of the object processing system of FIG. 37, wherein the wrapped pallet is removed from the trailer.

With reference to FIGS. 31 and 32, the pallet removal system 80 may be rotated with respect to the chassis 14 about the pin 84 (e.g., to 45 degrees as shown in FIGS. 34, and to 90 degrees as shown in FIG. 32). FIG. 33 shows an underside view of the pallet removal system 80 under the chassis conveyor 14, and FIG. 34 shows an underside view of the pallet removal system rotated 90 degrees (as in FIG. 32). The counterweight 110 facilitates lifting of a pallet, and casters 112 (together with wheels under the pivot end 82 and swing end 86) support the weight of the counterweight 110 and the pallet. FIG. 35 shows a pallet of objects being removed from the trailer, and FIG. 36 shows the pallet of objects rotated 90 degrees by the removal system. FIG. 37 shows an opposite side view of the pallet are rotated 90 degrees in FIG. 36, and FIG. 38 shows the pallet removed and unloaded from the removal system. The removed and unloaded pallet is no longer obstructing the removal of objects from the trailer, and the dynamic engagement system may re-enter the trailer and again begin removing objects. The removed and unloaded pallet may be processed by human personnel.

Figure 39A:
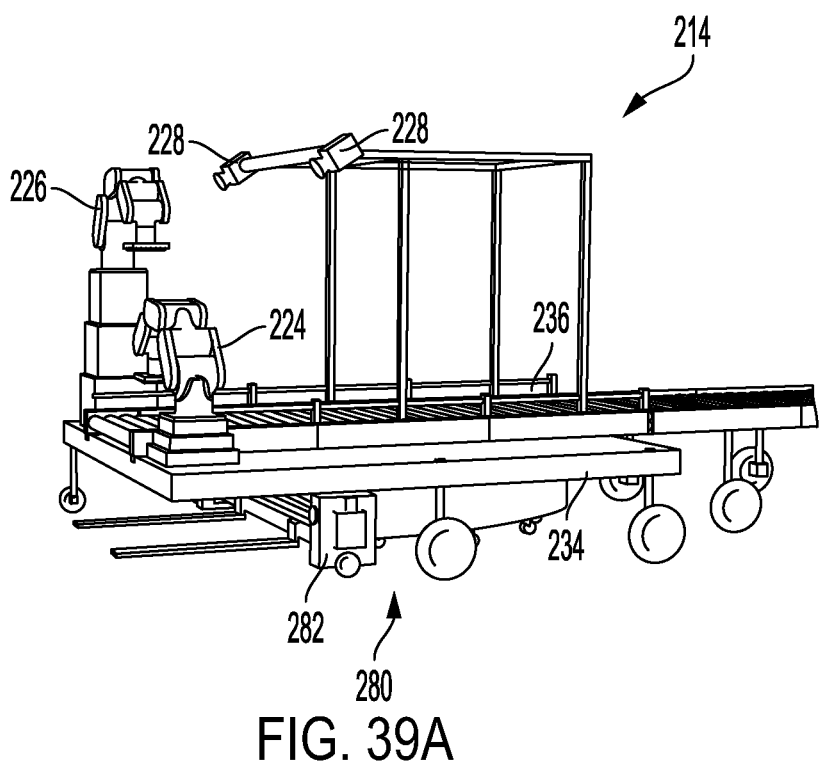
FIGS. 39A and 39B show illustrative diagrammatic views of an object processing system that includes a pallet removal system in accordance with another aspect of the present invention, showing the pallet removal system in a retracted position (FIG. 39A) and extended but not yet rotated (FIG. 39B)
Figure 39B:
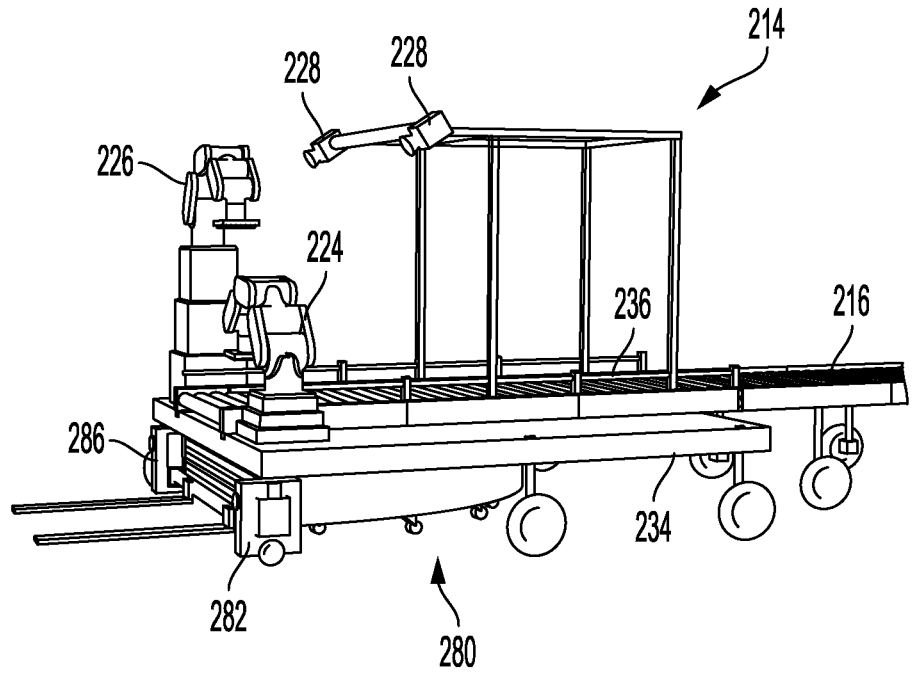
Figure 40:
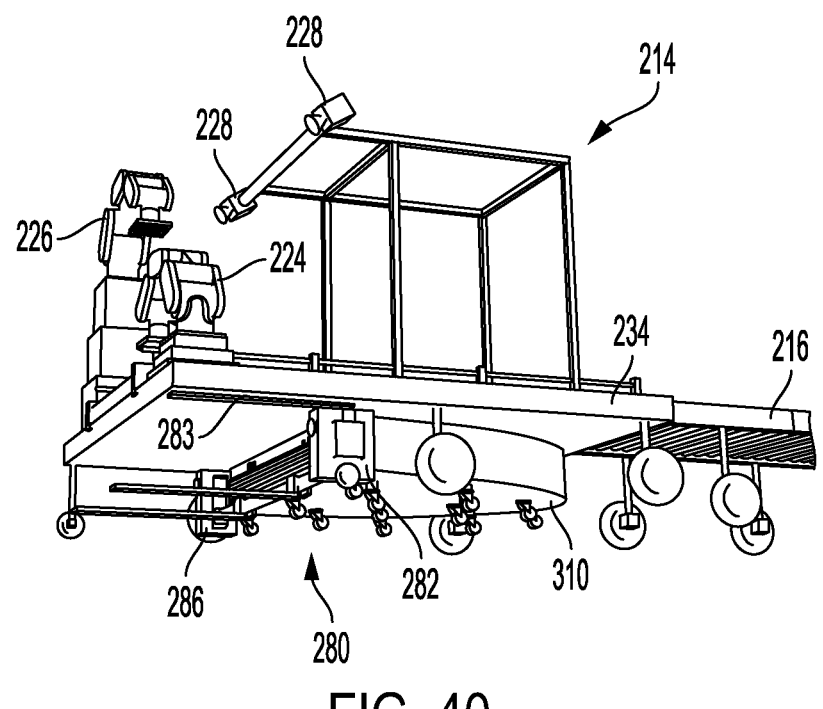
FIG. 40 shows an illustrative diagrammatic underside view of the object processing system of FIG. 39A that includes a pallet removal system in accordance with another aspect of the present invention, showing the pallet removal system in a retracted position.
Figure 41:
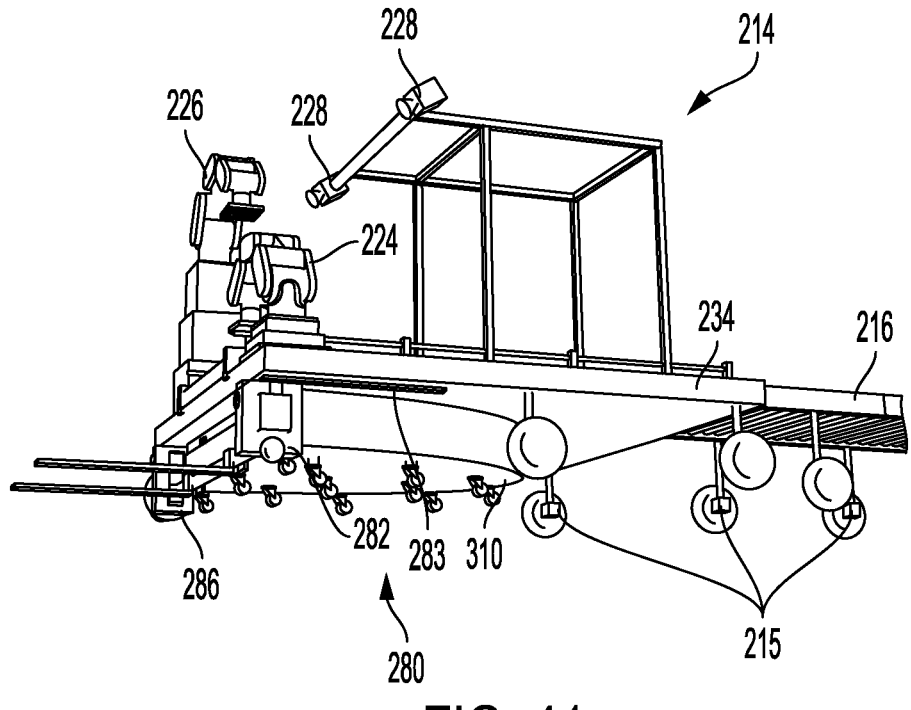
FIG. 41 shows an illustrative diagrammatic underside view of the object processing system of FIG. 39B that includes a pallet removal system in accordance with another aspect of the present invention, showing the pallet removal system in extended but not yet rotated position.

In accordance with further aspects, when the system employing tandem coordinated articulated arms detects the presence of a pallet as above, the system may employ an automated pallet removal system. In particular and with reference to FIGS. 39A and 39B, the system may include a pallet removal system 280 that includes a slidable pivot end 282 that first moves linearly along a track 283, and then rotates with respect to the chassis conveyor 214 by a pivot pin. The system also includes a rotating swing end 286, and both of the ends 282, 286 are coupled to a swing bar. The swing bar is attached to a counterweight portion 210 that is supported by a plurality of heavy-duty casters as shown in FIG. 40 (shown retracted) and FIG. 41 (shown extended but not yet rotated). The system includes the track 283 along which the pin is guided as the assembly moves linearly (powered by the active wheels) to move the assembly to the end of the chassis 214. The pallet removal system 280 also includes a pair of forks 294, 296 that are mounted to the cross bar, and the cross bar may be actively raised or lowered along tracks as controlled by the one or more computer processing systems 200. The pallet removal system 280 may also include one or more perception systems on the cross bar to aid the pallet removal process.

Figure 42:
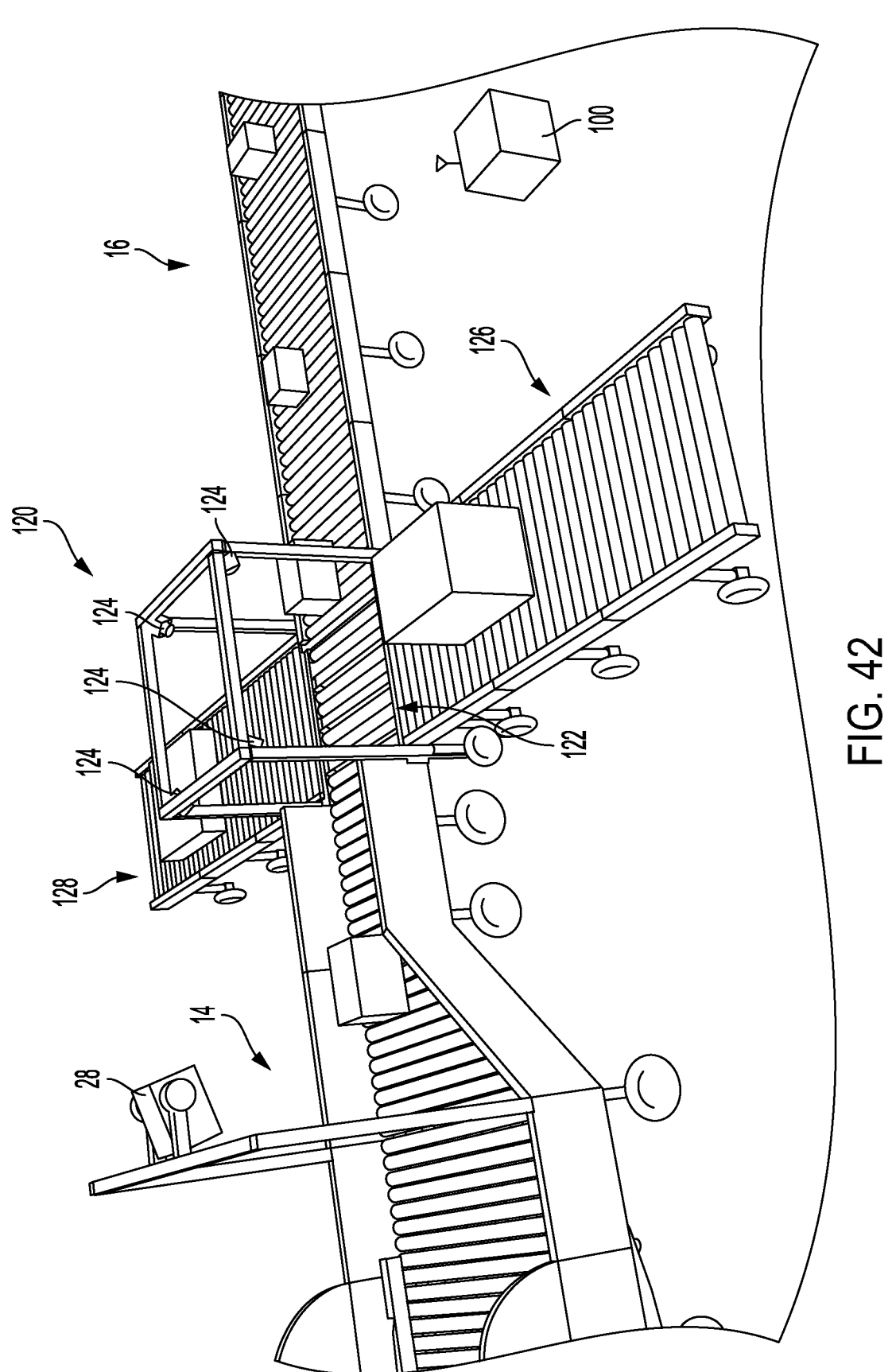
FIG. 42 shows an illustrative diagrammatic view of the object processing system of FIG. 38 wherein the objects are diverted based on any of weight or incompatibility.

FIG. 42 shows an output system in accordance with further aspects of the present invention that includes a perception system 120 with a diverting system 122. The perception system may include one or more perception units 124 that provide any of camera images, or scan data such as 2D or 3D scan data, or perception information regarding any identification code such as a barcode, QR code of other unique identification markings. The perception system may further include a weight sensing conveyor section as part of the diverting system 122 (e.g., with rollers or diverter belts mounted on load cells). The diverter 122 may include bi-directional belts that are selectively elevatable between the rollers. The perception and diverting systems sit between the chassis 14 and the warehouse conveyor 16, and permit outlier items such as heavy or large items to be diverted to one or another diverter paths 126, 128 for either alternate automated processing or for processing by human personnel. The decision to divert any object is based on the perception information from the perception system (e.g., size, weight, identification, etc.).

Those skilled in the art will appreciate that numerous modifications and variations may be made to the above disclosed embodiments without departing from the spirit and scope of the present invention.

What is claimed is:

1. An object processing system for facilitating removal of objects from a trailer of a tractor trailer, said object processing system comprising:
   an object obstruction detection system for identifying an obstruction during removal of objects;
   a force application system for applying any of a plurality of defined forces to the obstruction;
   a perception system for providing perception data regarding movement of the objects including the obstruction;

an assessment system for collecting force feedback information and perception data responsive to the application of force to the obstruction and providing assessment information; and a control system for providing a removal model for removing the obstruction based on the assessment information, the object processing system adapted to remove the obstruction using the removal model.

2. The object processing system as claimed in claim 1, wherein the force application system applies forces in each of three mutually orthogonal directions.

3. The object processing system as claimed in claim 1, wherein the force application system applies rotational forces along each of three mutually orthogonal axes.

4. The object processing system as claimed in claim 1, wherein the plurality of defined forces applied to the obstruction induce movement of any of the objects to rock the obstruction.

5. The object processing system as claimed in claim 1, wherein the control system records data from prior attempts and applies machine learning in providing the removal model.

6. The object processing system as claimed in claim 1, wherein the removal model includes information regarding whether an end-effector attached to a programmable motion device should be changed.

7. The object processing system as claimed in claim 1, wherein the object processing system further includes a pallet removal system for engaging a pallet and removing the pallet and the subset of the plurality of objects from the trailer.

8. The object processing system as claimed in claim 7, wherein the pallet removal system includes pallet lift forks that are mounted on a swing arm under the object processing system.

9. The object processing system as claimed in claim 1, wherein the removal model provides a classification of objects to facilitate processing of unknown objects.

10. The object processing system as claimed in claim 1, wherein the object processing system further includes a diverting system for diverting certain selected objects responsive to the perception data.

11. A method of facilitating removal of objects from a trailer of a tractor trailer, said method comprising:

identifying an obstruction during removal of objects within the trailer;

applying any of a plurality of defined forces to the obstruction;

collecting force feedback information and perception data regarding movement of the objects responsive to the application of force to the obstruction and providing assessment information; and providing a removal model for removing the obstruction based on the assessment information and removing the obstruction using the removal model.

12. The method as claimed in claim 11, wherein the force application system applies forces in each of three mutually orthogonal directions.

13. The method as claimed in claim 11, wherein the force application system applies rotational forces along each of three mutually orthogonal axes.

14. The method as claimed in claim 11, wherein the plurality of defined forces induces movement of any of the objects responsive efforts to rock the obstruction.

15. The method as claimed in claim 11, wherein the method further includes recording data from prior attempts and applying machine learning in providing the removal model.

16. The method as claimed in claim 11, wherein the removal model includes information regarding whether an end-effector attached to a programmable motion device should be changed.

17. The method as claimed in claim 11, wherein the method further includes engaging a pallet within the trailer and removing the pallet from the trailer.

18. The method as claimed in claim 11, wherein the removal model provides a classification of objects to facilitate processing of unknown objects.

19. The method as claimed in claim 11, wherein the method further includes diverting certain selected objects responsive to the perception data.

20. An obstruction assessment system for assessing an obstruction within a trailer of a tractor trailer, said obstruction assessment system comprising:

a force application system for applying a plurality of defined forces to an obstruction said plurality of forces including forces with a defined axis wherein the axes are mutually orthogonal;

a perception system for providing perception data regarding movement of the obstruction;

an assessment system for collecting force feedback information and perception data responsive to the application of force to the obstruction and providing assessment information; and a control system for providing a removal model for removing the obstruction based on the assessment information and to remove the obstruction using the removal model.

21. The obstruction assessment system as claimed in claim 20, wherein the force application system applies forces in each of three mutually orthogonal directions.

22. The obstruction assessment system as claimed in claim 20, wherein the force application system applies rotational forces along each of three mutually orthogonal axes.

23. The obstruction assessment system as claimed in claim 20, wherein the plurality of defined forces applied to the obstruction induces movement to rock the obstruction.

24. The obstruction assessment system as claimed in claim 20, wherein the control system records data from prior attempts and applies machine learning in providing the removal model.

25. The obstruction assessment system as claimed in claim 20, wherein the removal model includes information regarding whether an end-effector attached to a programmable motion device should be changed.

* * * * *